United States Patent
Stahl

(10) Patent No.: US 8,959,828 B2
(45) Date of Patent: Feb. 24, 2015

(54) LINE CONNECTOR APPARATUS

(76) Inventor: Samuel J. Stahl, Littleton, CO (US)

( * ) Notice: Subject to any disclaimer, the term of this patent is extended or adjusted under 35 U.S.C. 154(b) by 555 days.

(21) Appl. No.: 13/272,211

(22) Filed: Oct. 12, 2011

(65) Prior Publication Data

US 2013/0091756 A1   Apr. 18, 2013

(51) Int. Cl.
- *A01K 91/04* (2006.01)
- *A01K 91/03* (2006.01)
- *A01K 91/047* (2006.01)

(52) U.S. Cl.
CPC ............... *A01K 91/03* (2013.01); *A01K 91/047* (2013.01); *Y10S 24/908* (2013.01)
USPC ....... 43/44.91; 43/44.87; 43/44.83; 43/44.92; 43/44.95; 43/42.49; 43/43.15; 43/43.1; 24/908; 24/115 R; 24/132 R

(58) Field of Classification Search
CPC ...... A01K 91/03; A01K 91/04; A01K 91/047
USPC ................ 43/43.1, 44.87, 44.9, 44.91, 44.83, 43/44.89, 44.92, 44.93, 44.95, 42.49, 43/43.15; 24/908, 343, 344, 349, 487, 24/115 R, 132 R, 132 AA
See application file for complete search history.

(56) References Cited

U.S. PATENT DOCUMENTS

| | | | | |
|---|---|---|---|---|
| 524,928 A | * | 8/1894 | Bacon | 43/42.49 |
| 587,526 A | * | 8/1897 | Holden | 24/115 R |
| 670,328 A | * | 3/1901 | Rigby | 43/43.1 |
| 822,694 A | * | 6/1906 | Shepherd | 43/44.91 |
| 866,144 A | * | 9/1907 | Korbert | 24/115 R |
| 1,380,800 A | * | 6/1921 | Haworth | 24/115 R |
| 1,459,265 A | * | 6/1923 | Saundry | 24/132 R |
| 2,038,108 A | * | 4/1936 | Henley | 43/44.9 |
| 2,151,609 A | * | 3/1939 | Menderman | 43/44.91 |
| 2,214,961 A | * | 9/1940 | Hawley | 43/44.93 |
| 2,255,793 A | * | 9/1941 | Kridler | 43/44.83 |
| 2,316,074 A | * | 4/1943 | Kimbrough | 43/44.9 |
| 2,348,608 A | * | 5/1944 | Cleverly | 403/211 |
| 2,539,234 A | * | 1/1951 | Dobkowski | 43/44.91 |
| 2,547,469 A | * | 4/1951 | Husson | 43/42.49 |
| 2,595,806 A | * | 5/1952 | Morris | 24/115 R |
| 2,851,816 A | * | 9/1958 | Gehrig | 43/43.1 |

(Continued)

FOREIGN PATENT DOCUMENTS

| | | | | | |
|---|---|---|---|---|---|
| GB | 2324016 A | * | 10/1998 | ............ | A01K 91/04 |
| GB | 2345425 A | * | 7/2000 | ............ | A01K 91/03 |

(Continued)

*Primary Examiner* — Darren W Ark
(74) *Attorney, Agent, or Firm* — Roger A. Jackson

(57) ABSTRACT

A line connector apparatus for removably engaging a flexible line to an article, the apparatus including a beam with an external surface, the beam also including a flexible line end and an opposing article end. The apparatus has a void disposed partially within the flexible line end and the void is also partially formed from an open channel adjacent to the external surface. The void having a slip fit clearance with the flexible line, wherein the void communicates therethrough the flexible line end and the void receives the flexible line allowing the flexible line to be manually feed therethrough the void. The apparatus includes structure for selectively compressing the flexible line that is positioned within the open channel to change the slip fit clearance to an interference fit and the opposing article end is attached to the article. Operationally, the flexible line is affixed to the article via the beam.

5 Claims, 18 Drawing Sheets

(56) References Cited

U.S. PATENT DOCUMENTS

| | | | |
|---|---|---|---|
| 2,890,510 A * | 6/1959 | Spalding | 43/44.93 |
| 3,037,318 A * | 6/1962 | Schultz | 43/44.87 |
| 3,041,695 A * | 7/1962 | Ouellette | 43/44.83 |
| 3,066,372 A * | 12/1962 | Parker | 43/44.83 |
| 3,084,470 A * | 4/1963 | Heater | 43/44.91 |
| 3,140,520 A * | 7/1964 | Marino et al. | 43/43.15 |
| 3,533,184 A * | 10/1970 | Norman | 43/44.84 |
| 3,540,637 A * | 11/1970 | Warner et al. | 24/115 R |
| 3,765,118 A * | 10/1973 | Reitler | 43/43.12 |
| 3,834,061 A * | 9/1974 | Klein | 43/44.9 |
| 3,898,760 A * | 8/1975 | Klein | 43/44.83 |
| 3,939,594 A * | 2/1976 | Wagner | 43/42.49 |
| 3,988,852 A * | 11/1976 | Klein | 43/44.83 |
| 4,177,598 A * | 12/1979 | Jolley | 43/44.95 |
| 4,194,273 A * | 3/1980 | Williams | 43/44.92 |
| 4,493,134 A * | 1/1985 | Karr | 24/115 R |
| 4,633,609 A * | 1/1987 | Brown | 43/43.1 |
| 4,649,664 A * | 3/1987 | Mahan | 43/44.83 |
| 4,674,226 A * | 6/1987 | Mahan | 43/44.83 |
| 4,852,292 A * | 8/1989 | Pease | 43/43.1 |
| 4,864,767 A * | 9/1989 | Drosdak | 43/44.89 |
| 5,081,785 A * | 1/1992 | Kahng | 43/44.83 |
| 5,598,660 A * | 2/1997 | Walton | 43/42.49 |
| 5,617,616 A * | 4/1997 | Cutts, Sr. | 24/487 |
| 5,713,152 A * | 2/1998 | Domack | 43/44.95 |
| 6,125,574 A * | 10/2000 | Ganaja et al. | 43/44.93 |
| 7,117,629 B2 * | 10/2006 | Brzozowski | 43/43.15 |
| 7,178,841 B1 * | 2/2007 | Moreno | 24/136 L |
| 7,475,510 B2 * | 1/2009 | Franklin | 43/44.91 |
| 7,490,433 B2 * | 2/2009 | Schoenike | 43/44.91 |
| 7,565,763 B1 * | 7/2009 | Ruzicka | 43/44.91 |
| 7,784,432 B1 * | 8/2010 | Johnson | 43/44.91 |
| 7,861,457 B2 * | 1/2011 | Blette et al. | 43/44.9 |
| 7,971,422 B2 * | 7/2011 | Shnayder et al. | 43/44.83 |
| 8,196,338 B2 * | 6/2012 | Kavanaugh | 43/44.92 |
| 8,261,484 B2 * | 9/2012 | Bono | 43/44.92 |
| 8,321,998 B2 * | 12/2012 | Warren | 24/134 R |
| 2008/0034640 A1 * | 2/2008 | Naerheim et al. | 43/44.92 |
| 2009/0044441 A1 * | 2/2009 | Neal et al. | 43/44.83 |
| 2011/0203156 A1 * | 8/2011 | Christiansen | 43/43.1 |
| 2013/0008077 A1 * | 1/2013 | Koch-Schmidt | 43/44.87 |
| 2013/0014427 A1 * | 1/2013 | Rothan | 43/43.1 |

FOREIGN PATENT DOCUMENTS

| | | | | |
|---|---|---|---|---|
| JP | 04104751 A * | 4/1992 | | A01K 91/047 |
| JP | 04126029 A * | 4/1992 | | A01K 91/04 |
| JP | 06269240 A * | 9/1994 | | A01K 91/047 |
| JP | 08023843 A * | 1/1996 | | A01K 91/047 |
| JP | 08089143 A * | 4/1996 | | A01K 91/03 |
| JP | 10215740 A * | 8/1998 | | A01K 91/047 |
| JP | 2002233281 A * | 8/2002 | | A01K 91/047 |
| JP | 2004049076 A * | 2/2004 | | A01K 91/03 |
| JP | 2004357688 A * | 12/2004 | | A01K 91/047 |
| JP | 2005192507 A * | 7/2005 | | A01K 91/047 |
| JP | 2006325439 A * | 12/2006 | | A01K 91/03 |
| JP | 2009125051 A * | 6/2009 | | A01K 91/047 |
| JP | 2012239389 A * | 12/2012 | | A01K 91/03 |
| WO | WO 9841086 A1 * | 9/1998 | | A01K 91/04 |
| WO | WO 2009023297 A1 * | 2/2009 | | A01K 91/04 |

* cited by examiner

LINE CONNECTOR APPARATUS

TECHNICAL FIELD

The present invention relates generally to an apparatus, which is employed to affix a flexible line to a connector without the need for the manual tying of the line to the connector, wherein the connector is also attached to an article. More particularly, the present invention of the line connector apparatus facilitates the easy and fast connection of a fishing line to the connector that is also attached to the article in the form of a leader line, bait, lure, bubble, swivel, hook, and the like, the line connector apparatus eliminates the need for tying a knot to affix the fishing line to the connector via having a thread through arrangement for the fishing line that creates a smooth tortuous path for the fishing line to follow in conjunction with a clamp that secures the fishing line to the connector.

BACKGROUND OF INVENTION

In many types of fishing there is a need to linearly connect various sections of fishing line, either because of different properties of each line section, such as test tensile strength, materials of construction for the line, various articles to attach to the line, or to repair a line break such as snagging on the water bottom or cutting/chaffing the line on sharp hard objects in or out of the water. Thus, the need to re-attach the fishing line to the connector is quite often for the reasons stated above, conventionally the fishing line is re-attached to the connector (typically a swivel) via tying the line through a loop in the connector using a knot, wherein the knot must not kink the line or come loose or slip. As anyone who has tried it, tying a knot in a monofilament fishing line is not easy, as the line itself resists bending easily, plus the transparent nature on the line makes it hard to see it, further the small size-diameter wise of the fish line being about 0.020 of an inch typically, makes it even harder to see and work with, and especially in the case of an older individual, wherein their skills of eyesight, motor skills, manual dexterity all have declined to some extent, making the tying of a knot on a fishing line to a connector all the more difficult, especially if this is a task that they occasionally do. Plus adding to this, that the knotted portion of the fish line is the weakest point due to the sharp bends and folds in the line causing stress points or tears, thus the need for correct knot tying is important to minimize the chance of the fish line breaking where the knot is tied.

Looking at the prior art in this area in U.S. Pat. No. 7,861,457 to Blette, et al. disclosed is a splice system for the linear connection of fishing lines that includes a female connector and a male connector. Each connector in Blette has first and second opposite ends, a longitudinal axis, and a smoothly shaped exterior surface. The first end of the female connector in Blette is connected to a first fishing line section; the second end has a first opening; and the connector has a raised interior feature. The second end of the male connector in Blette is connected to a second fishing line section; the first end is configured for coaxial insertion into the first opening of the female connector, and the first end has a raised exterior feature. The connectors in Blette have a first relative position representing a disengaged state and a second relative position representing an engaged state with the first relative position and the second relative position are rotationally displaced about the axis. Note in Blette, that knots in the fish line are still required to attach the fish line to each of the male and female connectors on both ends of the line.

Continuing in the prior art, in U.S. Pat. No. 4,864,767 to Drosdak disclosed is a fly line connector comprising an elongated or cigar-shaped body having a loop connector at one end portion and a jaw clamping means at the other end portion. The jaw means in Drosdak grips the fishing line and a locking means locks the jaw means over the fishing line. Drosdak does not teach the problems of crimping potential damage to the fish line from the jaw clamping means biting into the fishing line, which would be a concern that the jaw ends would weaken the line through deforming the fish line cross section. Further, as shown in FIG. 1, the Drosdak device will still require a knot to be tied in the fish line for the eyelet 12, thus not completely eliminating the manual process of fish line knot tying.

Further, in the prior art in U.S. Pat. No. 4,194,273 to Williams disclosed an attachment for fishing lines and tackle comprising molded thermoplastic first and second members adapted for an interlocking attachment to each other, the first member having ring means for the attachment of one or more fishing lines, the ring means having a central opening of irregular dimensions whereby a plurality of peripheral indentations are formed providing predetermined spaced line tying positions. The first member in Williams also having a stud with enlarged head for receiving and retaining the second member in a locking engagement, the second member having a keyhole opening enabling the second member to pass over the stud and secure from behind, the second member having an additional slot extending radially outwardly of the larger portion of the keyhole opening thereby providing for the attachment of a fishing line diametrically opposite the slot of said keyhole opening. Again, in Williams note that tied knots are still required on both ends of the line for the attachment as shown in FIG. 1 line elements 15 and 16.

Continuing in the prior art, in U.S. Pat. No. 3,988,852 to Klein disclosed a hook connector for connecting a snell line or leader to the shank of a hook. The connector in Klein is formed as a short, resilient member of a tough, hard, synthetic resin such as nylon, which may be connected to or molded on a hook shank. The connector in Klein in one embodiment has a central passageway therethrough with a larger diameter portion meeting a smaller diameter portion at a shoulder therein. In Klein, a snell is attached to the connector by threading it through the passageway, knotting the end of the snell, and drawing the snell back into the larger diameter portion of the passageway until the knot abuts the shoulder and engages the side wall of the passageway with a tight fit. In another embodiment in Klein, the passageway terminates at a side opening socket wherein the knot in the snell is snugly fitted. Further in Klein, again, note that at least one line knot is required as shown in FIGS. 5, 9, and 10, thus there is no benefit of knot tying elimination.

Yet further in the prior art, in U.S. Pat. No. 3,834,061 again to Klein discloses a connector or a link for joining a leader to a fly line is formed as a small cigar or like shaped member. A passageway opening to Klein at each end receives the end of the line and the end of the leader, with a transverse hole at the center intersecting the passageways from the ends to provide opposing side openings. In Klein the end of the line and the end of the leader are threaded through their passageways to project from the side openings and they are then knotted and the knots are pulled back into the side opening to complete the connection. Again, note that in Klein, knots are still required on both ends of the line as shown in FIG. 5, thus again there is no benefit of knot tying elimination.

What is needed is a line connector device that eliminates the need to tie knots in the fishing monofilament line when changing line strength ratings, replacing damaged line, changing leaders, changing lures, bait, and the like. This would allow for easier and quicker fishing line changes in the connector, especially by older occasional fisherman who's eyesight and manual dexterity have declined and who don't fish on a regular basis by not having to cut and re-tie the fish line numerous times. Thus the skill, patience, needing good light, needing good weather-meaning dry and no wind, or being in a rocking boat, issues are not a problem when the fisherman is relieved from having to tie knots in fishing line multiple times to attach or re-attach to connectors.

SUMMARY OF INVENTION

According to broadly defining the present invention, a line connector apparatus is disclosed for removably engaging a flexible line to an article, the flexible line having a long axis and an original diameter. The line connector apparatus including a beam having a longitudinal axis, the beam having an external surface portion, the beam also including a flexible line end portion and an opposing article end portion along the longitudinal axis. The flexible line end portion has a void that is disposed partially within the flexible line portion and the void is also partially formed from an open channel adjacent to the external surface portion. The void having a slip fit clearance with the flexible line, the void having a lengthwise axis, wherein the void communicates therethrough the flexible line end portion, wherein the void receives the flexible line allowing the flexible line to be manually feed therethrough the void along the long axis. Also included in the line connector apparatus is a means for selectively compressing the flexible line that is positioned adjacent to the open channel to change the slip fit clearance to an interference fit and the opposing article end portion is attached to the article. Wherein, operationally the flexible line is affixed to the flexible line end portion along the long axis via the interference fit resulting in the flexible line being attached to the article.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
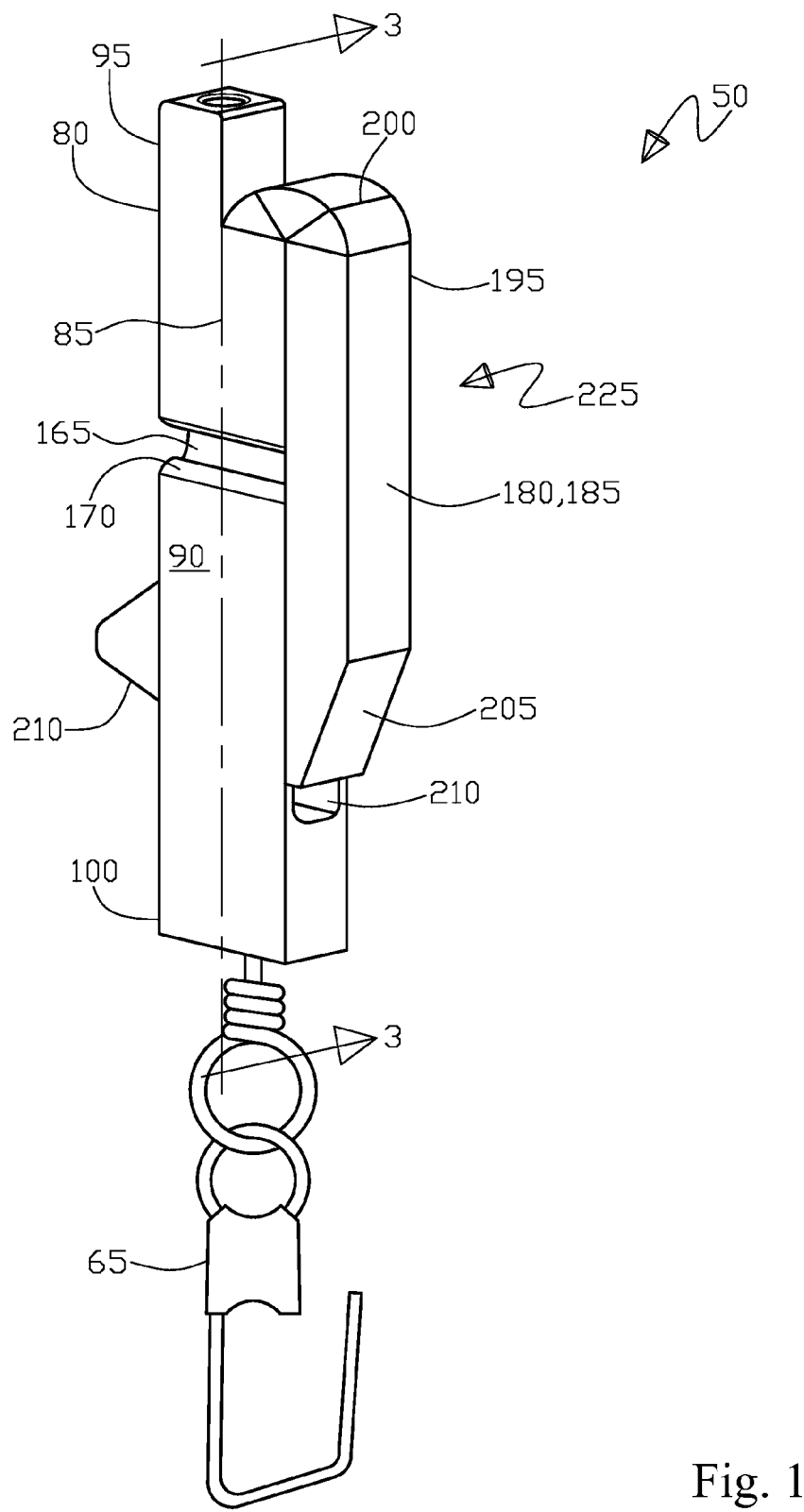
FIG. 1 shows a perspective view of the line connector apparatus in the closed operational state for the finger having the pivotally attached proximal end portion, and the distal end portion that is removably engaged to the article end portion, also shown is the article in the form of a swivel and the necked aperture, the beam, the longitudinal axis, the flexible line end portion, the article end portion, the external surface portion, however, without the flexible line present.

50 Line connector apparatus
55 Flexible line
60 Frictional load of the flexible line 55
65 Article
70 Long axis of the flexible line 55
75 Original diameter of the flexible line 55
80 Beam
85 Longitudinal axis of the beam 80
90 External surface portion of the beam 80
95 Flexible line end portion of the beam 80
100 Article end portion of the beam 80
105 Void
110 Lengthwise axis of void 105
115 Void disposed partially within the flexible line portion 95
120 Open channel of the void 105
125 Slip fit clearance of the void 105 with the flexible line 55
130 Void receiving the flexible line 55
135 Tortuous passageway of the void 105
140 Right angle turns of the tortuous passageway 135
145 Substantially equidistant relationship of the right angle turns 140
150 Continuous contoured surface of the void 105
155 Symmetric tortuous passageway 135
160 Chamfered transitions from the open channel 120 to the passageway 135
165 Necked aperture of the passageway 135
170 Flared section between the necked aperture 165 and the external surface portion 90
175 Loop formed along the lengthwise axis 110
180 Means for selectively compressing the flexible line 55
185 Finger
190 Finger being oppositely disposed of a portion of the passageway 135
195 Proximal end portion of the finger 190
200 Pivotal attachment of the proximal end 195
205 Distal end portion of the finger 190
210 Removable engagement of the distal end portion 205 to the article end portion 100

215 Interference fit of the flexible line 55 into the void 105
220 Open operational state of the finger 185
225 Closed operational state of the finger 185
230 Compression of the flexible line 55 in the tortuous passageway 135
235 Line securing device
240 Body
245 First end portion of the body 240
250 Second end portion
255 Surrounding sidewall on the body 240
260 Axial axis of the surrounding sidewall 255
265 Inner surface on surrounding sidewall 255
270 Interior of surrounding sidewall 255
275 Outer surface on surrounding sidewall 255
280 Opening in the first end portion 245
285 Bore in surrounding sidewall 255
290 Size in diameter of the bore 285
295 Slot in surrounding sidewall 255
300 Peripheral margin of the slot 295
305 Tine of the peripheral margin 300
310 Distance from tine 305 projection to the peripheral margin 300
315 Wedging of the flexible line 55 against the tine 305
320 Line engaging apparatus
325 Frame
330 Primary end portion of frame 325
335 Secondary end portion of the frame 325
340 Spanning axis on the frame 325
345 Contractible tube
350 Insertion state diameter of tube 345
355 Engaging state diameter of tube 345
360 Flexible expanded metal surrounding sidewall
365 Length of the flexible expanded metal surrounding sidewall 360
370 Diamond shaped slits of the flexible expanded metal surrounding sidewall 360
375 Major axis of the diamond shaped slit 370
380 Minor axis of the diamond shaped slit 370
385 Parallel relationship between the major axis 375 and the spanning axis 340
390 Surrounding sidewall frictionally encasing the flexible line 55
395 Smooth inner surface of the surrounding sidewall 360

DETAILED DESCRIPTION

Figure 2:
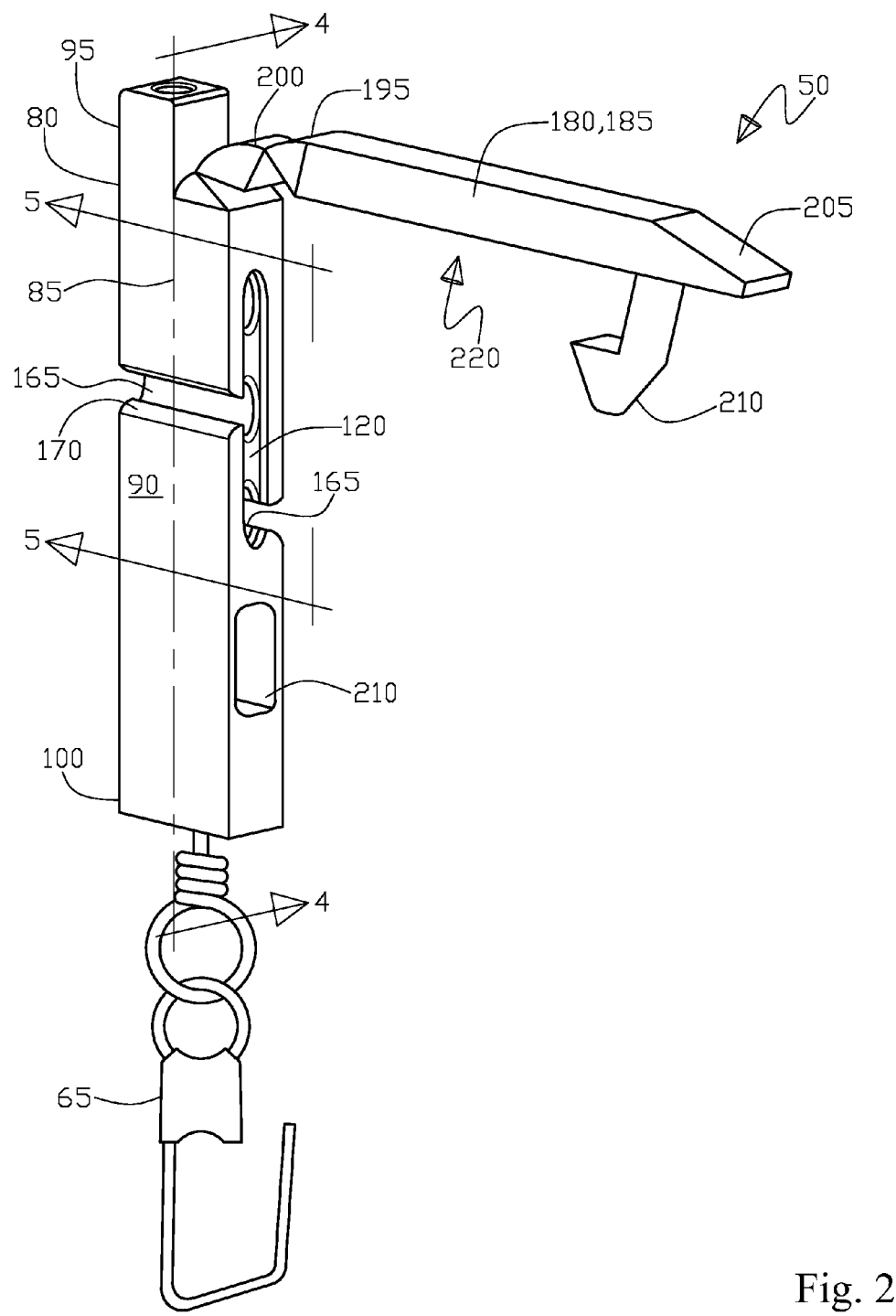
FIG. 2 shows a perspective view of the line connector apparatus in the open operational state for the finger having the pivotally attached proximal end portion, and the distal end portion that is removably engaged to the article end portion, also shown is the article in the form of a swivel and the necked aperture, the beam, the longitudinal axis, the flexible line end portion, the article end portion, the external surface portion, plus the open channel, however, without the flexible line present.

With initial reference to FIG. 1 shown is a perspective view of the line connector apparatus 50 in the closed operational state 225 for the finger 185 having the pivotally attached 200 proximal end portion 195, and the distal end portion 205 that is removably engaged 210 to the article end portion 100, also shown is the article 65 in the form of a fishing line 65 swivel. Also shown in FIG. 1 is the necked aperture 165, the beam 80, the longitudinal axis 85, the flexible line end portion 95, the article end portion 100, and the external surface portion 90, however, without the flexible line 55 present. Continuing, FIG. 2 shows a perspective view of the line connector apparatus 50 in the open operational state 220 for the finger 185 having the pivotally attached 200 proximal end portion 195, and the distal end portion 205 that is removably engaged 210 to the article end portion 100. Also shown in FIG. 2 is the article 65 in the form of a fishing line swivel and the necked aperture 165, the beam 80, the longitudinal axis 85, the flexible line end portion 95, the article end portion 100, the external surface portion 90, plus the open channel 120, however, without the flexible line 55 present.

Figure 3:
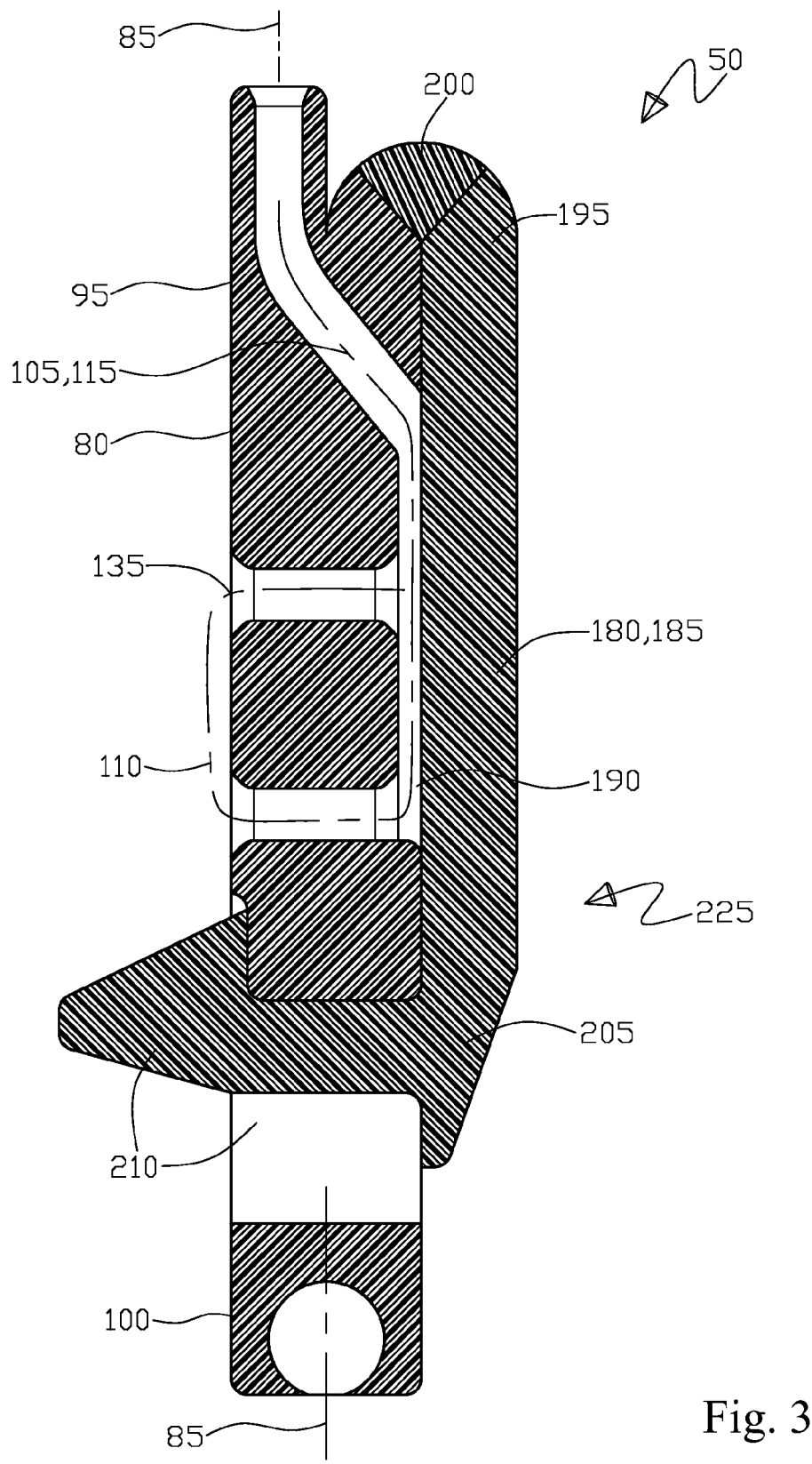
FIG. 3 shows cross sectional view 3-3 from FIG. 1, of the line connector apparatus in the closed operational state for the finger having a proximal end portion with pivotal attachment and a distal end portion, with the finger positioned opposite from a portion of the passageway being the open channel, however, without the flexible line present, also shown is the removable engagement of the finger to the article end portion of the beam, also the void which is partially disposed within the flexible line portion of the beam, further the longitudinal axis, the means for selectively compressing the flexible line, at least three right angle turns of the tortuous void passageway, the lengthwise axis, the continuous contoured surface, the equidistant at least three right angle turns, and the outward chamfer from the passageway to the open channel.
Figure 4:
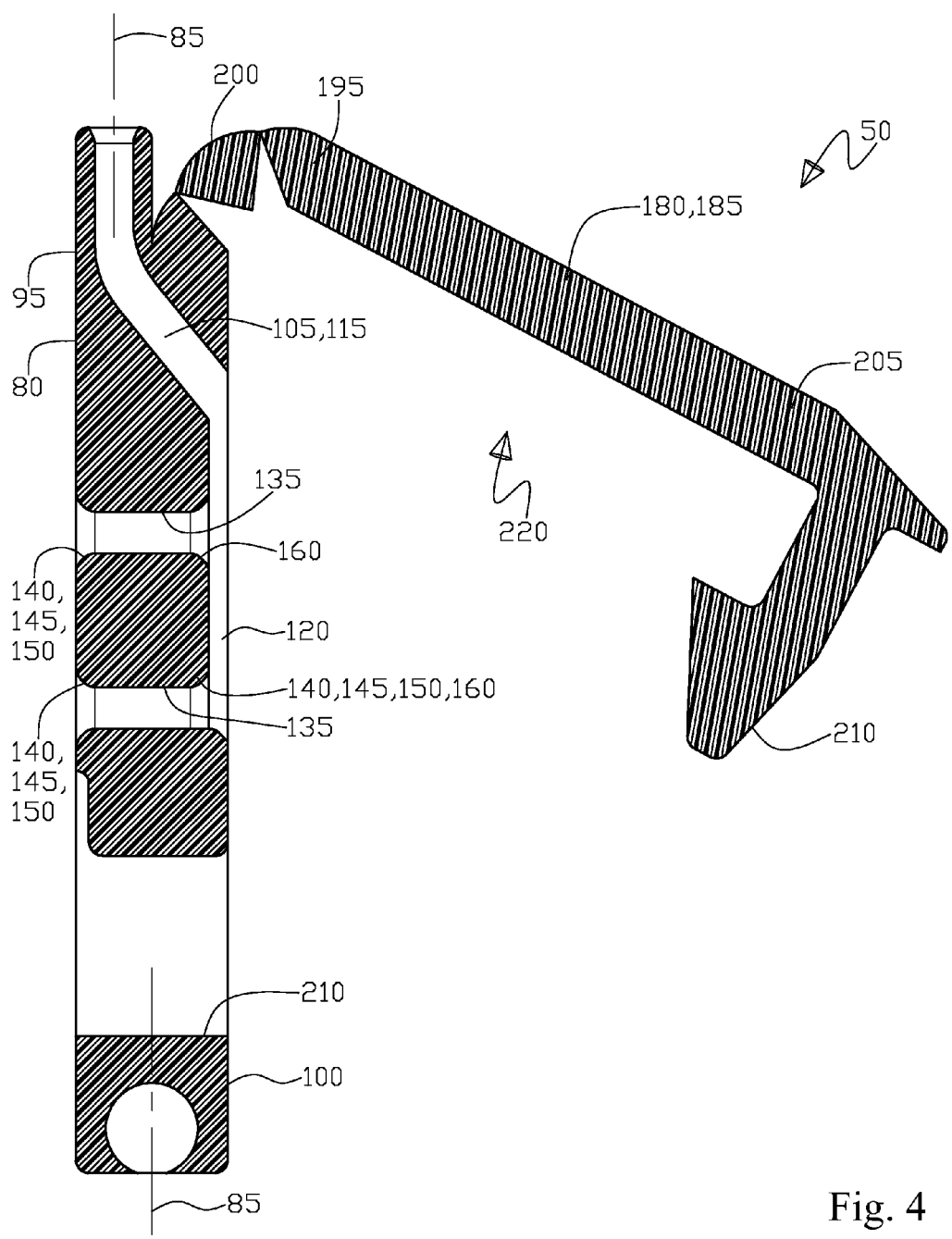
FIG. 4 shows cross sectional view 4-4 from FIG. 2, of the line connector apparatus in the open operational state for the finger having a proximal end portion with pivotal attachment and a distal end portion, with the finger positioned opposite from a portion of the passageway being the open channel, however, without the flexible line present, also shown is the removable engagement of the finger to the article end portion of the beam, also the void which is partially disposed within the flexible line portion of the beam, further the longitudinal axis, the means for selectively compressing the flexible line, at least three right angle turns of the tortuous void passageway, the lengthwise axis, the continuous contoured surface, the equidistant at least three right angle turns, and the outward chamfer from the passageway to the open channel.

Further, FIG. 3 shows cross sectional view 3-3 from FIG. 1, of the line connector apparatus 50 in the closed operational state 225 for the finger 185 having a proximal end portion 195 with pivotal attachment 200 and the distal end portion 205, with the finger 185 positioned opposite 190 from a portion of the passageway 135 being the open channel 120, however, again without the flexible line 55 present. FIG. 3 also shows is the removable engagement 210 of the finger 185 to the article end portion 100 of the beam 80, also the void 105 which is partially disposed 115 within the flexible line portion 95 of the beam 80. Further in FIG. 3 shown is the longitudinal axis 85, the means 180 for selectively compressing the flexible line 55, at least three right angle turns 140 of the tortuous void passageway 135, the lengthwise axis 110, the continuous contoured surface 150, the equidistant 145 at least three right angle turns 140, and the outward chamfer 160 from the passageway 135 to the open channel 120, Next, FIG. 4 shows cross sectional view 4-4 from FIG. 2, of the line connector apparatus 50 in the open operational state 220 for the finger 185 having a proximal end portion 195 with pivotal attachment 200 and the distal end portion 205, with the finger 185 positioned opposite 190 from a portion of the passageway 135 being the open channel 120, however, also without the flexible line 55 present. Further shown in FIG. 4 is the removable engagement 210 of the finger 185 to the article end portion 100 of the beam 80, also the void 115 which is partially disposed 115 within the flexible line portion 95 of the beam 80, also the longitudinal axis 85. In addition, FIG. 4 shows the means 180 for selectively compressing the flexible line 55, at least three right angle turns 140 of the tortuous void passageway 135, the lengthwise axis 110, the continuous contoured surface 150, the equidistant 145 at least three right angle turns 140, and the outward chamfer 160 from the passageway 135 to the open channel 120.

Figure 5:
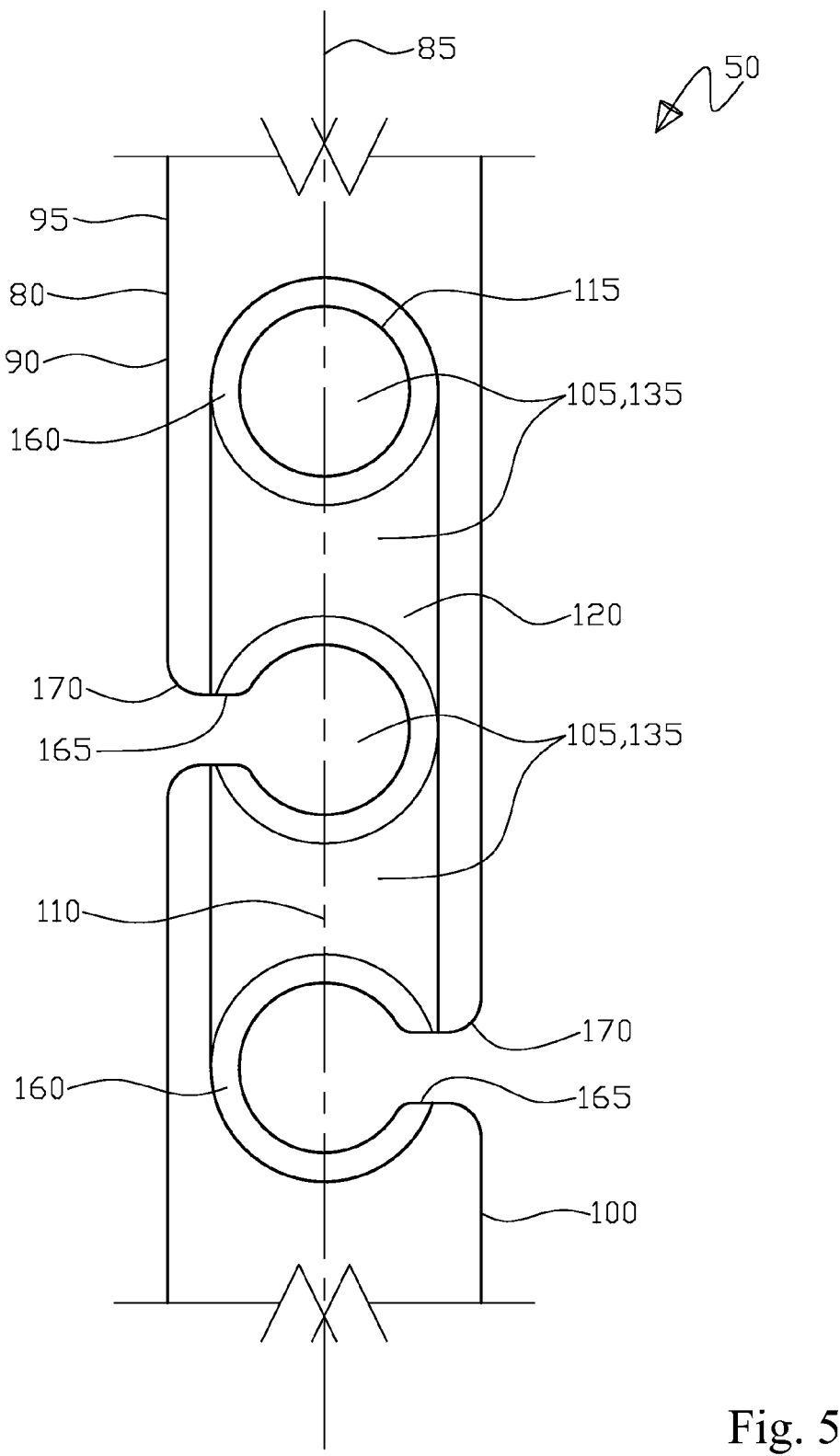
FIG. 5 is end view 5-5 from FIG. 2 showing in detail the necked aperture with the accompanying flared section in positional relationship with the tortuous passageway and specifically with the void disposed partially within the flexible line portion of the beam.
Figure 6:
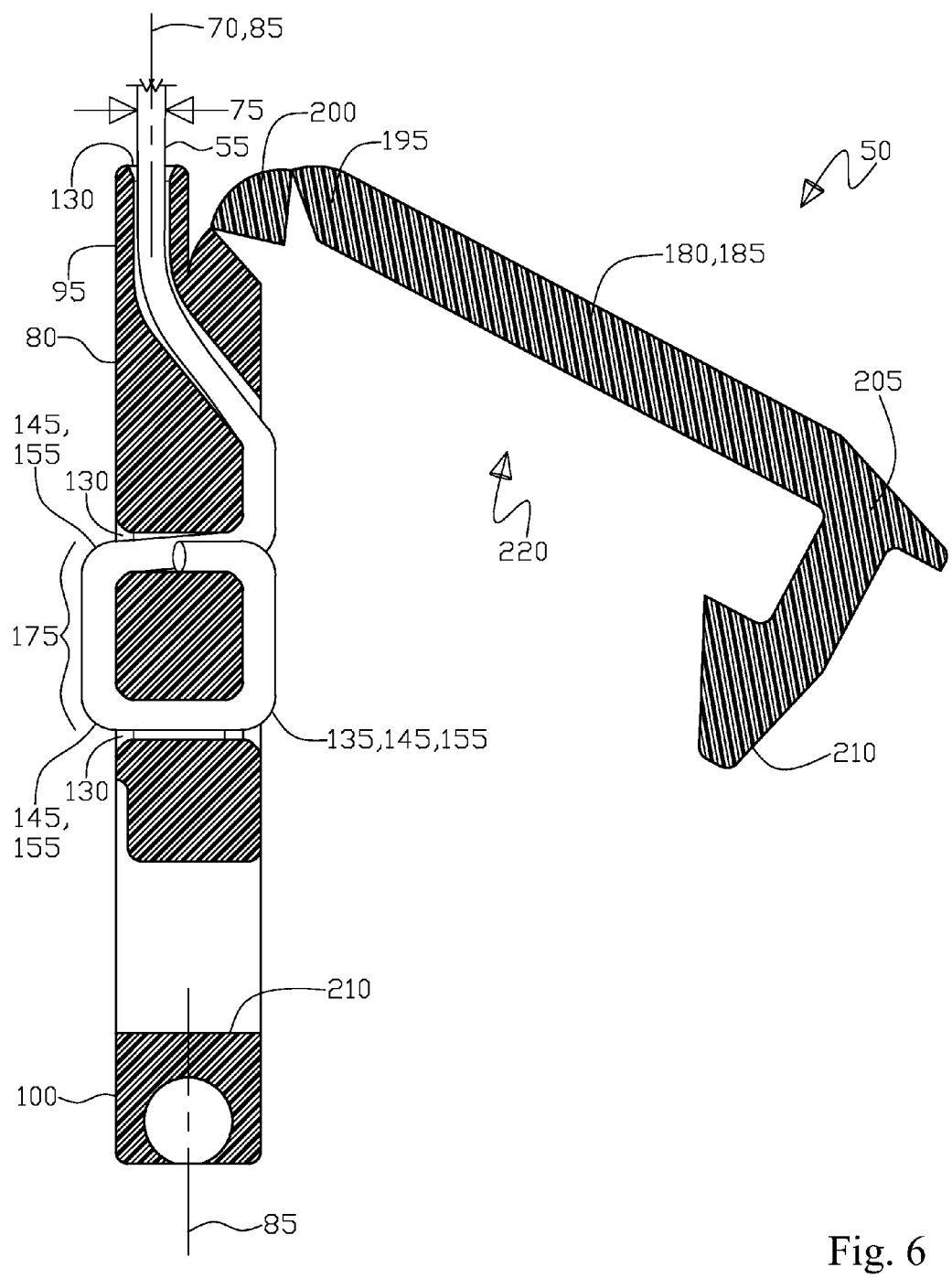
FIG. 6 shows the cross sectional view from FIG. 4, with the addition of the flexible line to show a loop of the flexible line, wherein the line connector apparatus in the open operational state for the finger having a proximal end portion with pivotal attachment and a distal end portion, with the finger positioned opposite from a portion of the passageway being the open channel, also shown is the removable engagement of the finger to the article end portion of the beam, also the void which is partially disposed within the flexible line portion of the beam, further the longitudinal axis, the means for selectively compressing the flexible line, at least three right angle turns of the tortuous void passageway, the lengthwise axis, the continuous contoured surface, the equidistant at least three right angle turns, and the outward chamfer from the passageway to the open channel.

Yet further shown in FIG. 5 is end view 5-5 from FIG. 2 showing in detail the necked aperture 165 with the accompanying flared section 170 in positional relationship with the tortuous passageway 135 and specifically with the void 115 disposed partially within the flexible line portion 95 of the beam 80. Continuing, FIG. 6 shows the cross sectional view from FIG. 4, with the addition of the flexible line 55 to show a loop 175 of the flexible line 55, wherein the line connector apparatus 50 is in the open operational state 220 for the finger 185 having a proximal end portion 195 with pivotal attachment 200 and the distal end portion 205, with the finger 185 positioned opposite 190 from a portion of the passageway 135 being the open channel 120. Also shown in FIG. 6 is the removable engagement 210 of the finger 185 to the article end portion 100 of the beam 80, also the void 105 which is partially disposed 115 within the flexible line portion 95 of the beam 80. Further in FIG. 6, shown is the longitudinal axis 85, the means 180 for selectively compressing the flexible line 55, at least three right angle turns 140 of the tortuous void passageway 135, the lengthwise axis 110, the continuous contoured surface 150, the equidistant 145 at least three right angle turns 140, and the outward chamfer 160 from the passageway 135 to the open channel 120.

Figure 7:
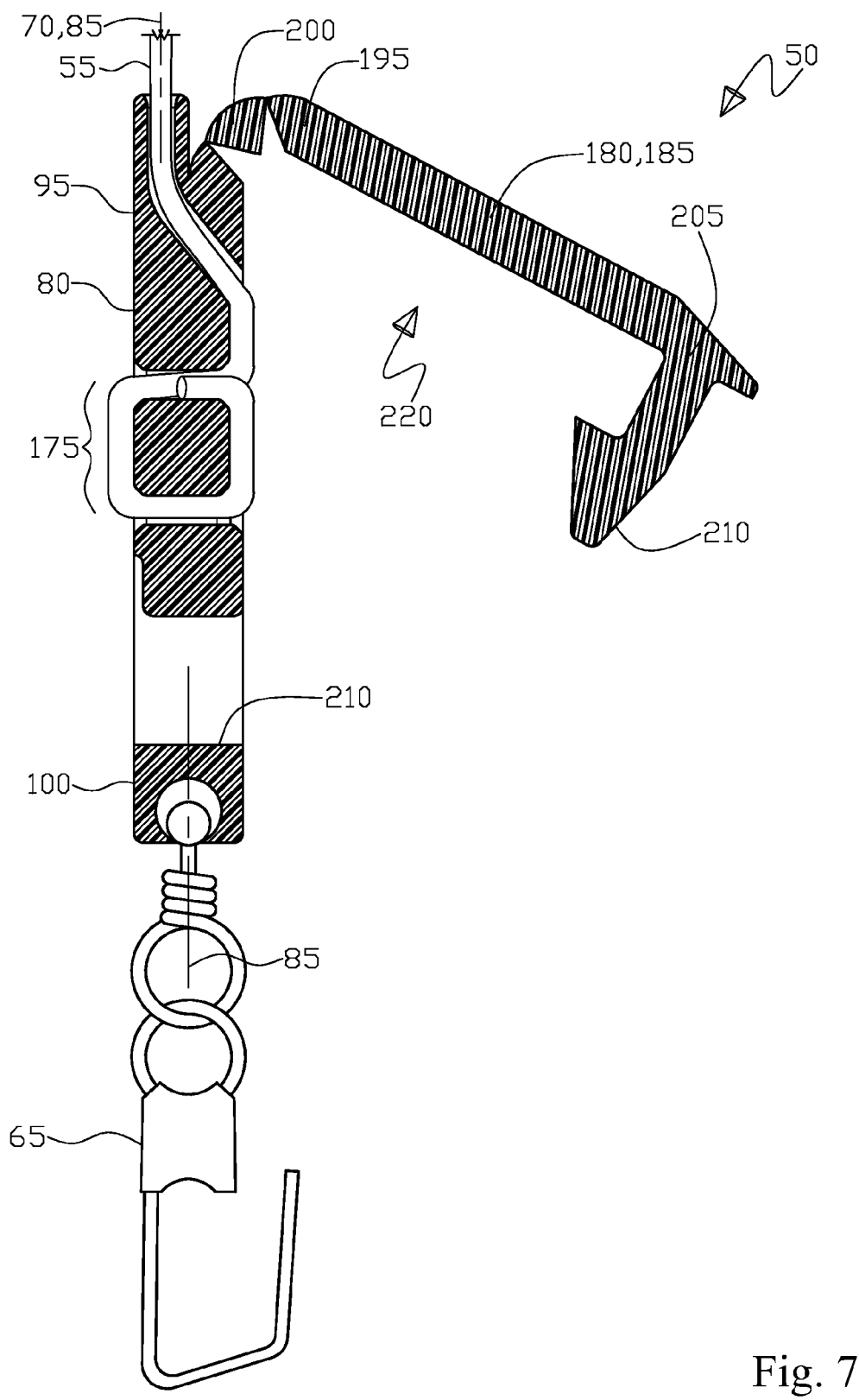
FIG. 7 shows the cross sectional view from FIG. 6, with the addition of the swivel attached to the article end portion of the beam, the flexible line shows a loop of the flexible line, wherein the line connector apparatus in the open operational state for the finger having a proximal end portion with pivotal attachment and a distal end portion, with the finger positioned opposite from a portion of the passageway being the open channel, also shown is the removable engagement of the finger to the article end portion of the beam, also the void which is partially disposed within the flexible line portion of the beam, further the longitudinal axis, the means for selectively compressing the flexible line, at least three right angle turns of the tortuous void passageway, the lengthwise axis, the continuous contoured surface, the equidistant at least three right angle turns, and the outward chamfer from the passageway to the open channel.

Continuing, FIG. 7 shows the cross sectional view from FIG. 6, with the addition of the swivel 65 attached to the article end portion 100 of the beam 80, the flexible line 55 shows a loop 175 of the flexible line 55, wherein the line connector apparatus 50 in the open operational state 220 for the finger 185 having a proximal end portion 195 with pivotal attachment 200 and a distal end portion 205. With FIG. 7 showing the finger 185 positioned opposite 190 from a portion of the passageway 135 being the open channel 120, also shown is the removable engagement 210 of the finger 185 to the article end portion 100 of the beam 80. Also shown in FIG. 7 is the void 105 which is partially disposed 115 within the flexible line portion 95 of the beam 80, further shown is the longitudinal axis 85, the means 180 for selectively compressing the flexible line 55, at least three right angle turns 140 of the tortuous void passageway 135, the lengthwise axis 110, the continuous contoured surface 150, the equidistant 145 at least three right angle turns 140, and the outward chamfer 160 from the passageway 135 to the open channel 120.

Figure 8:
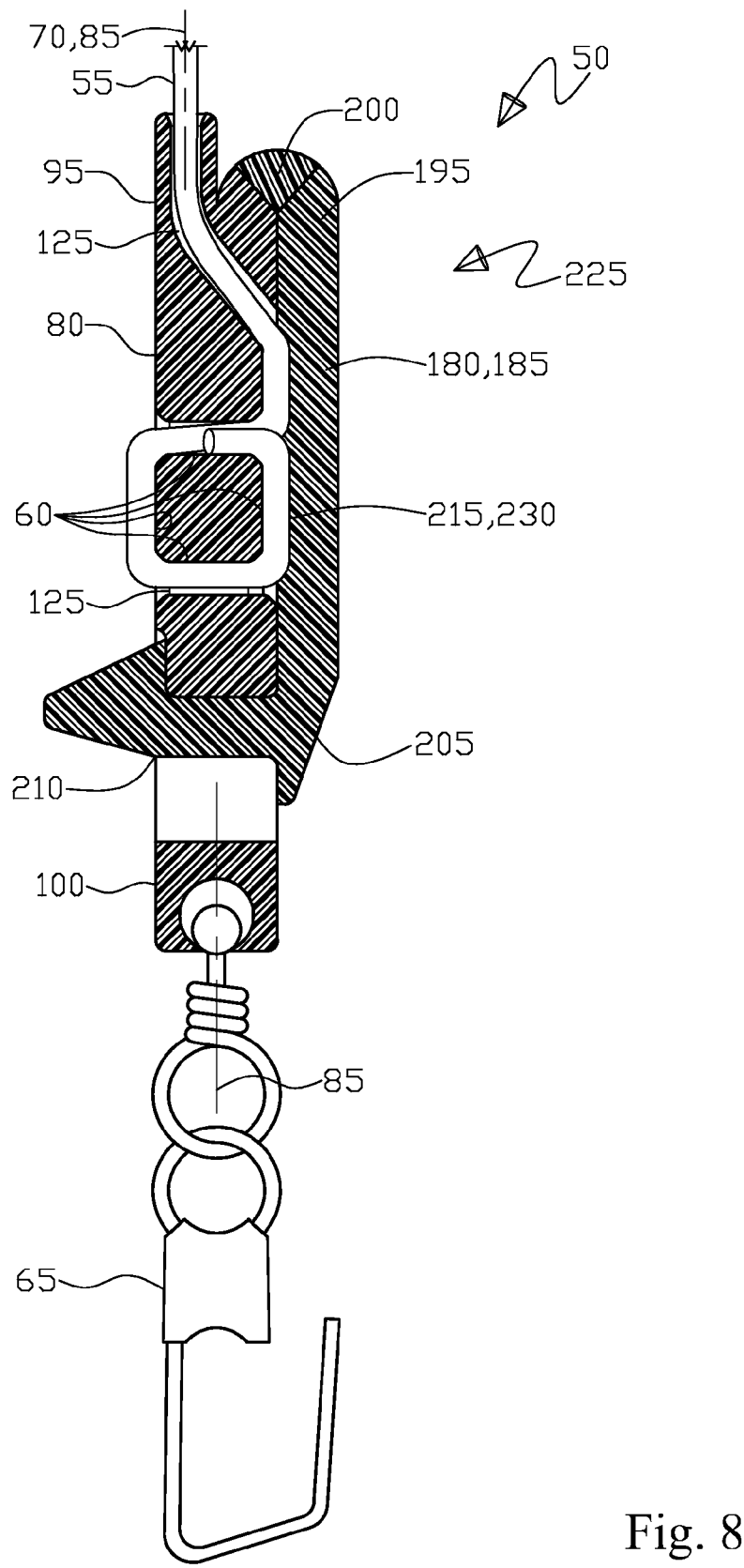
FIG. 8 shows the cross sectional view from FIG. 7, with the swivel attached to the article end portion of the beam, the flexible line shows a loop of the flexible line, wherein the line connector apparatus in the closed operational state for the finger showing the compression of the flexible line via the finger or means for selectively compressing the flexible line, the finger having a proximal end portion with pivotal attachment and a distal end portion, with the finger positioned opposite from a portion of the passageway being the open channel, also shown is the removable engagement of the finger to the article end portion of the beam, also the void which is partially disposed within the flexible line portion of the beam, further the longitudinal axis, at least three right angle turns of the tortuous void passageway, the lengthwise axis, the continuous contoured surface, the equidistant at least three right angle turns, and the outward chamfer from the passageway to the open channel.

Moving onward, FIG. 8 shows the cross sectional view from FIG. 7, with the swivel 65 attached to the article end portion 100 of the beam 80, the flexible line 55 shows a loop 175 of the flexible line 55, wherein the line connector apparatus 50 in the closed operational state 225 for the finger 185 showing the compression 230 of the flexible line 55 via the finger 185 or means 180 for selectively compressing the flexible line 55. FIG. 8 also showing the finger 185 having a proximal end portion 195 with pivotal attachment 200 and a distal end portion 205, with the finger 185 positioned opposite 190 from a portion of the passageway 135 being the open channel 120. Also shown in FIG. 8 is the removable engagement 210 of the finger 185 to the article end portion 100 of the beam 80, also the void 105 which is partially disposed 115 within the flexible line portion 95 of the beam 80, further shown is the longitudinal axis 85, at least three right angle turns 140 of the tortuous void passageway 135, the lengthwise axis 110, the continuous contoured surface 150, the equidistant 145 at least three right angle turns 140, and the outward chamfer 160 from the passageway 135 to the open channel 120.

Figure 9:
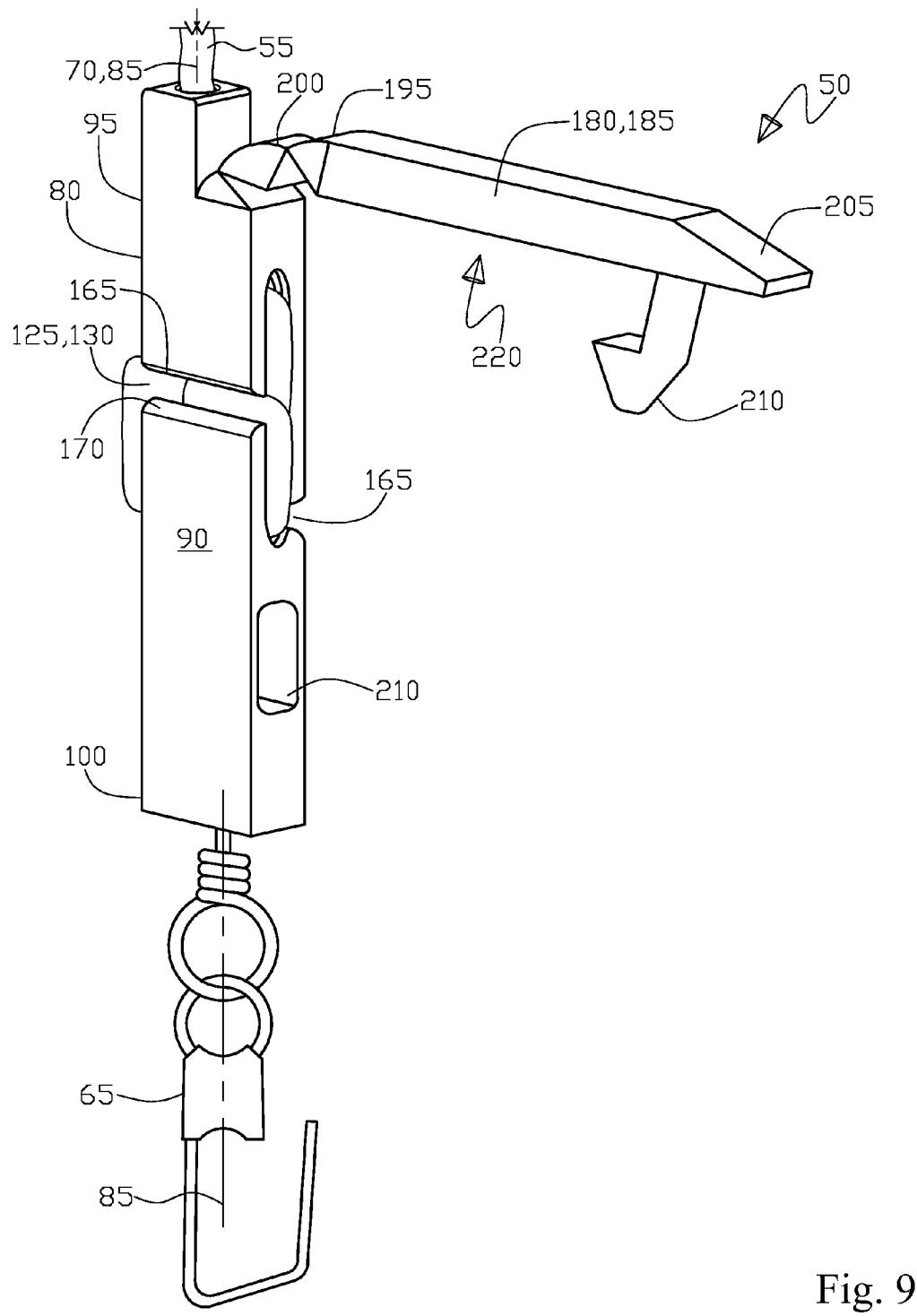
FIG. 9 shows a perspective view of the line connector apparatus in the open operational state for the finger having the pivotally attached proximal end portion, and the distal end portion that is removably engaged to the article end portion, also shown is the article in the form of a swivel and the necked aperture, the beam, the longitudinal axis, the flexible line end portion, the article end portion, the external surface portion, plus the open channel, however, also the flexible line is shown residing in the open channel just prior to being compressed by the finger.

Next, FIG. 9 shows a perspective view of the line connector apparatus 50 in the open operational state 220 for the finger 185 having the pivotally attached 200 proximal end portion 195, and the distal end portion 205 that is removably engaged 210 to the article end portion 100. Also shown in FIG. 9 is the article 65 in the form of a swivel and the necked aperture 165, the beam 80, the longitudinal axis 85, the flexible line end portion 95, the article end portion 100, the external surface portion 90, plus the open channel 120, however, also the flexible line 55 is shown residing in the open channel 120 just prior to being compressed 230 by the finger 185.

Figure 10:
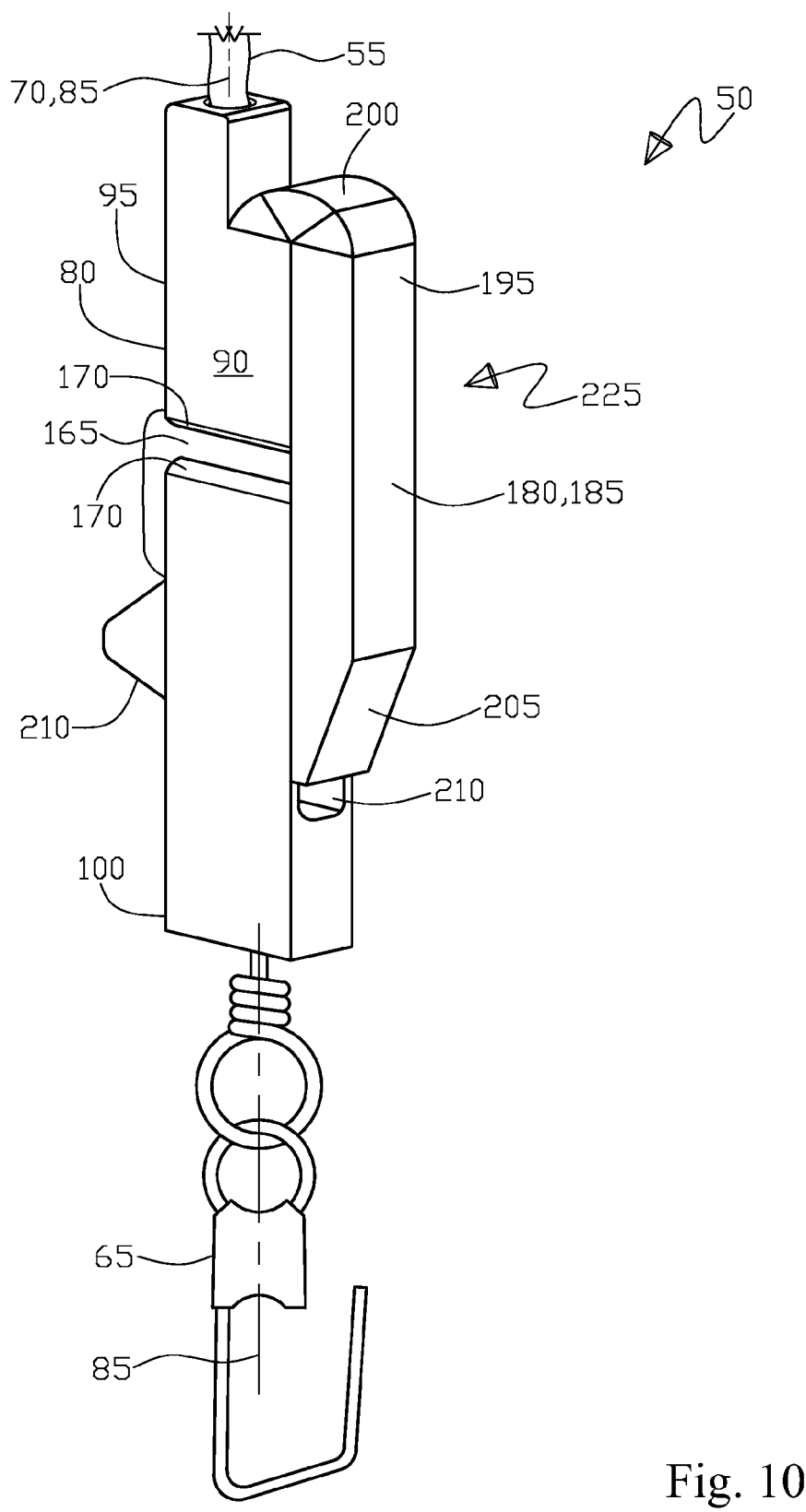
FIG. 10 shows a perspective view of the line connector apparatus in the closed operational state for the finger having the pivotally attached proximal end portion, and the distal end portion that is removably engaged to the article end portion, also shown is the article in the form of a swivel and the necked aperture, the beam, the longitudinal axis, the flexible line end portion, the article end portion, the external surface portion, however, also the flexible line is shown being compressed with the finger in the closed state, wherein the flexible line is attached to the article or swivel via the beam.

Further, FIG. 10 shows a perspective view of the line connector apparatus 50 in the closed operational state 225 for the finger 185 having the pivotally attached 200 proximal end portion 195, and the distal end portion 205 that is removably engaged 210 to the article end portion 100. Also shown in FIG. 10 is the article 65 in the form of a swivel and the necked aperture 165, the beam 80, the longitudinal axis 85, the flexible line end portion 95, the article end portion 100, the external surface portion 90, however, also the flexible line 55 is shown being compressed 230 with the finger 185 in the closed state 225, wherein the flexible line 55 is attached to the article 65 or swivel via the beam 80.

Figure 11:
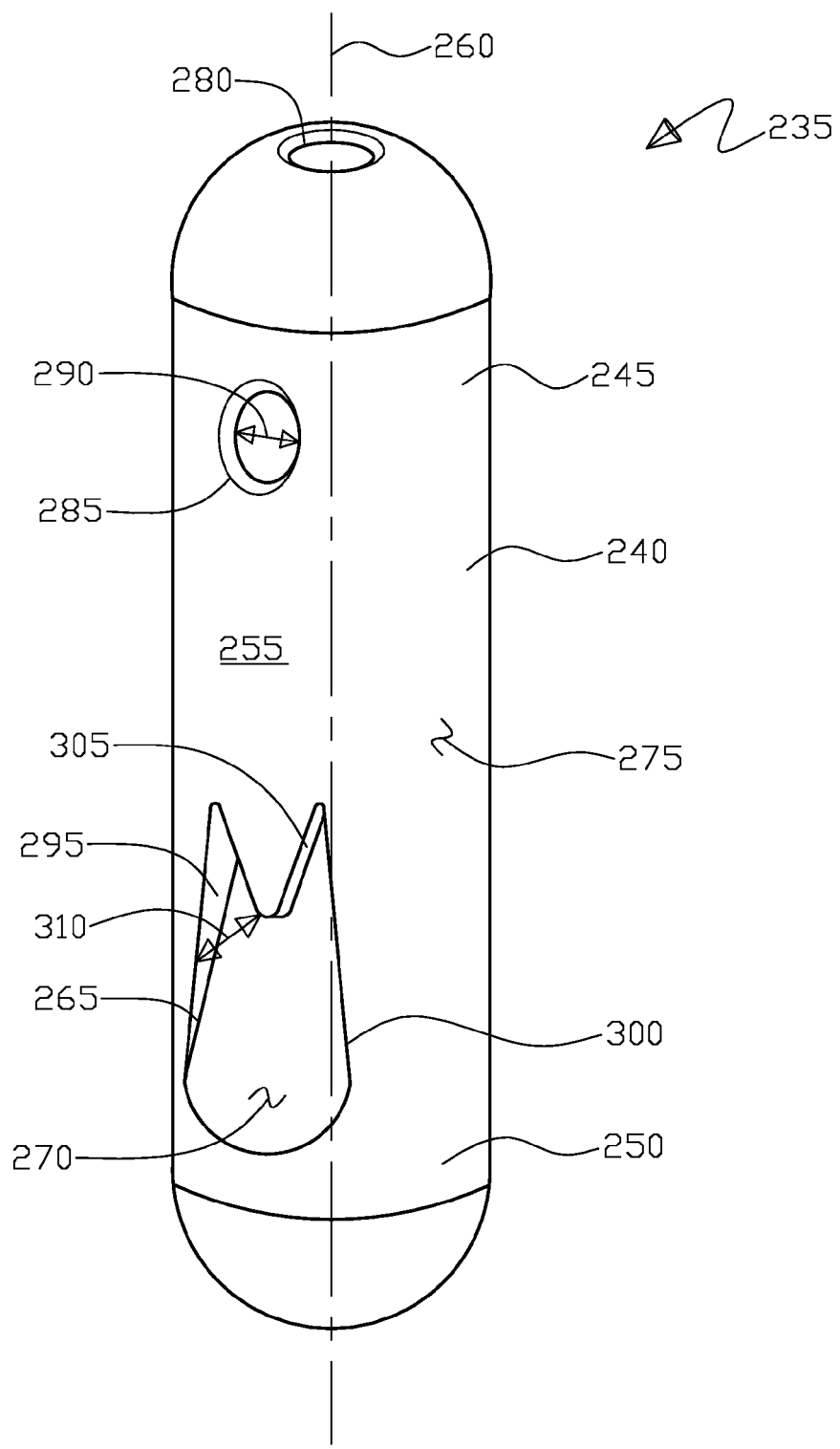
FIG. 11 shows a perspective view for a line securing device showing the body having a first end portion and a second end portion, further a surrounding sidewall, and the axial axis, also the surrounding sidewall having an inner surface, an interior, and an outer surface, further shown is an opening, a bore, with a bore size, and a slot, with the slot having a peripheral margin that includes a tine, also a distance from the tine to the periphery.
Figure 12:
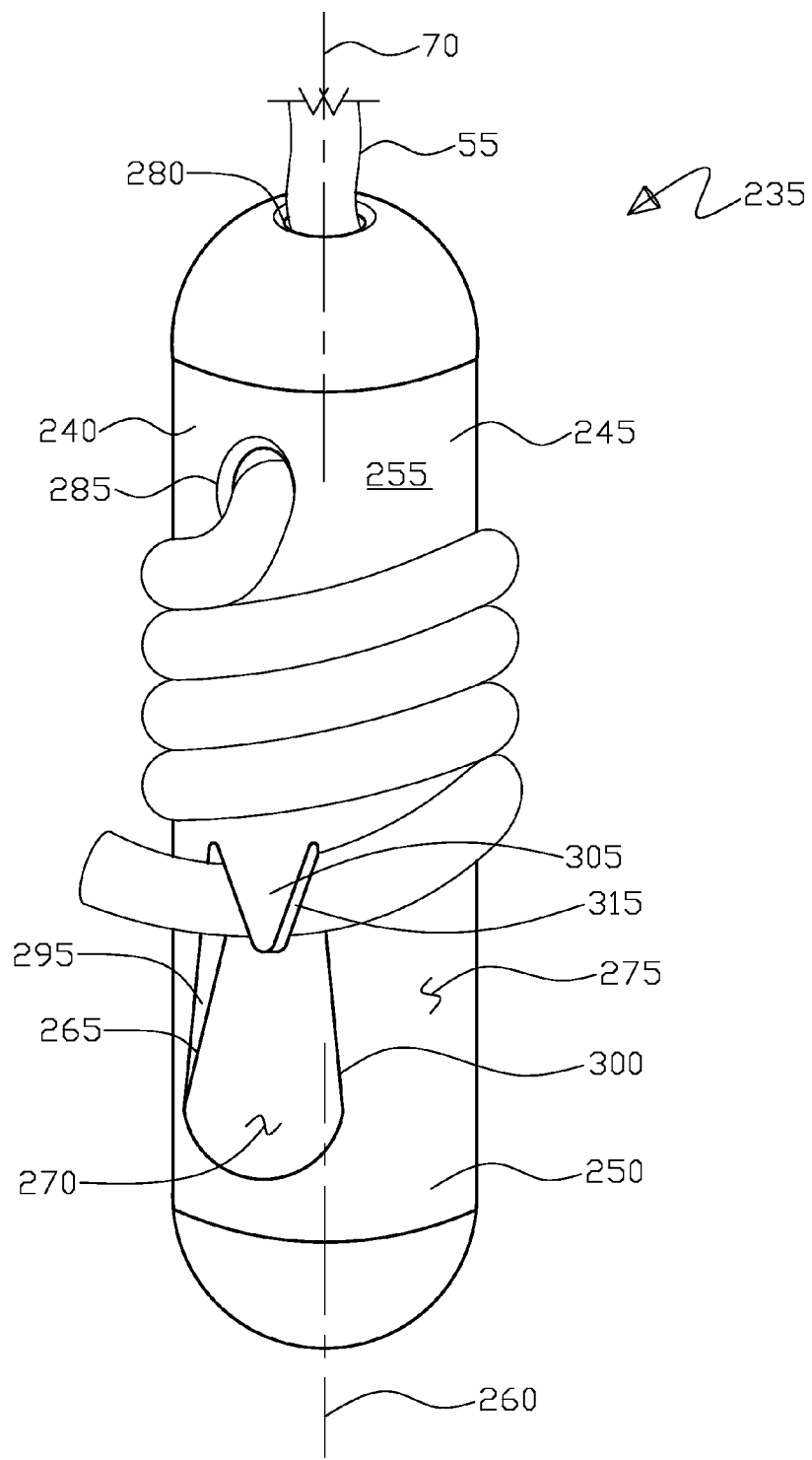
FIG. 12 shows a perspective view of for the line securing device including the flexible line, showing the body having a first end portion and a second end portion, further a surrounding sidewall, and the axial axis, also the surrounding sidewall having an inner surface, an interior, and an outer surface, further shown is an opening, a bore, with a bore size, and a slot, with the slot having a peripheral margin that includes a tine, also a distance from the tine to the periphery, the flexible line feed through the opening and then through the bore to the outer surface where the flexible line is wrapped about the axial axis in contact with the outer surface wherein the flexible line is wrapped under the tine, thus wedging the flexible line against the outer surface to attach the flexible line to the article via the body.

Continuing, FIG. 11 shows a perspective view for a line securing device 235 showing the body 240 having a first end portion 245 and a second end portion 250, further a surrounding sidewall 255, and the axial axis 260, also the surrounding sidewall 255 having an inner surface 265, an interior 270, and an outer surface 275, further shown is an opening 280, a bore 285, with a bore size 290, and a slot 295, with the slot 295 having a peripheral margin 300 that includes a tine 305, also a distance 310 from the tine 305 to the periphery 300. Next, FIG. 12 shows a perspective view of for the line securing device 235 including the flexible line 55, showing the body 240 having a first end portion 245 and a second end portion 250, further a surrounding sidewall 255, and the axial axis 260. Also, FIG. 12 shows the surrounding sidewall 255 having an inner surface 265, an interior 270, and an outer surface 275, further shown is an opening 280, a bore 285, with a bore size 290, and a slot 295, with the slot 295 having a peripheral margin 300 that includes a tine 305. Further shown in FIG. 12 is a distance 310 from the tine 305 to the periphery 300, the flexible line 55 feed through the opening 280 and then through the bore 285 to the outer surface 275 where the flexible line 55 is wrapped about the axial axis 260 in contact with the outer surface 275 wherein the flexible line 55 is wrapped under the tine 305, thus wedging 315 the flexible line 55 against the outer surface 275 to attach the flexible line 55 to the article 65 via the body 240.

Figure 13:
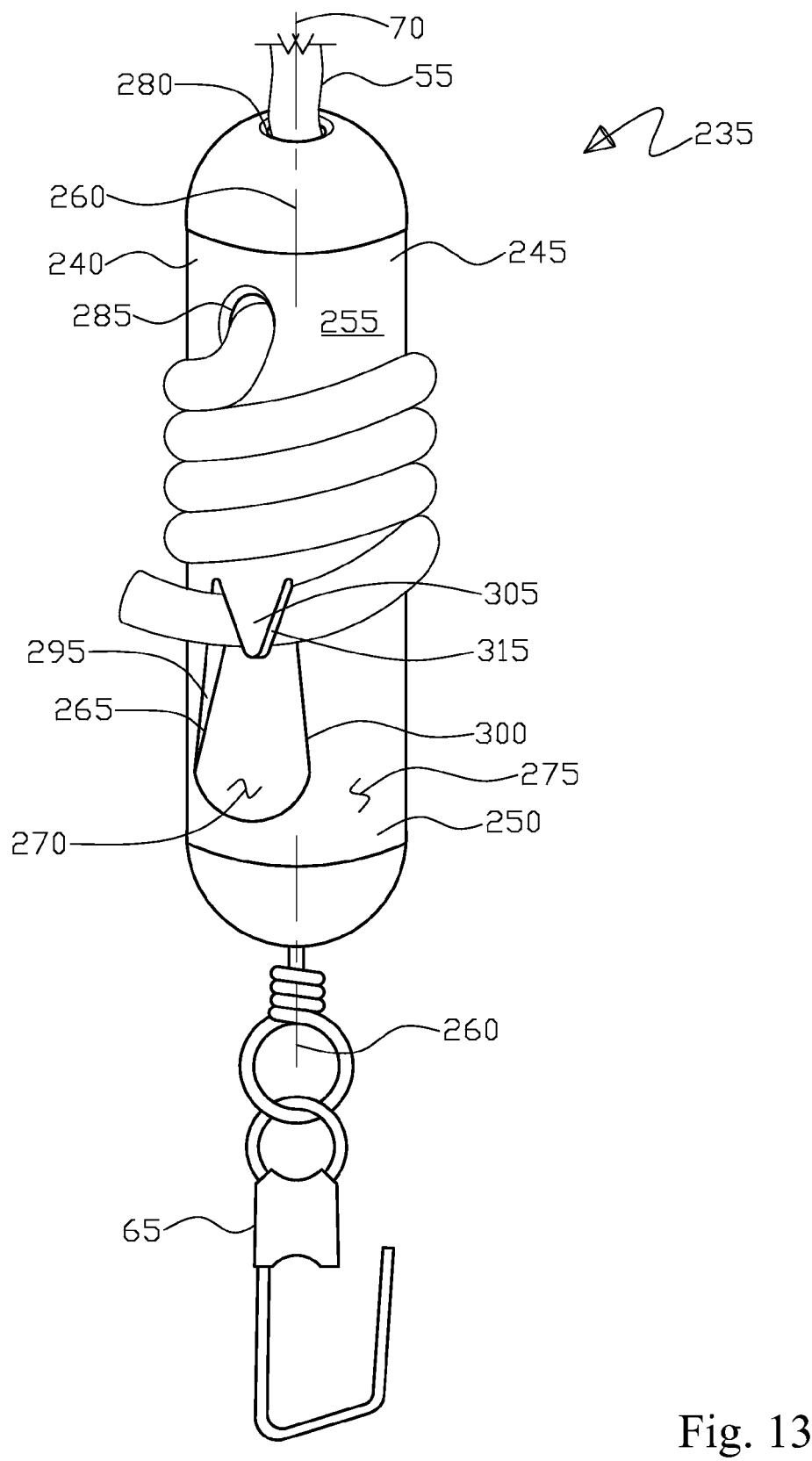
FIG. 13 shows a perspective view of for the line securing device in FIG. 12 with the addition of the article in the form of a swivel, including the flexible line, showing the body having a first end portion and a second end portion, further a surrounding sidewall, and the axial axis, also the surrounding sidewall having an inner surface, an interior, and an outer surface, further shown is an opening, a bore, with a bore size, and a slot, with the slot having a peripheral margin that includes a tine, also a distance from the tine to the periphery, the flexible line feed through the opening and then through the bore to the outer surface where the flexible line is wrapped about the axial axis in contact with the outer surface wherein the flexible line is wrapped under the tine, thus wedging the flexible line against the outer surface to attach the flexible line to the article via the body.

Further, FIG. 13 shows a perspective view of for the line securing device 235 in FIG. 12 with the addition of the article 65 in the form of a swivel, including the flexible line 55, showing the body 240 having a first end portion 245 and a second end portion 250, further a surrounding sidewall 255, and the axial axis 260, also the surrounding sidewall 255 having an inner surface 265, an interior 270, and an outer surface 275. Further shown in FIG. 13 is an opening 280, a bore 285, with a bore size 290, and a slot 295, with the slot 295 having a peripheral margin 300 that includes a tine 305, also a distance 310 from the tine 305 to the periphery 300. In addition, FIG. 13 shows the flexible line 55 feed through the opening 280 and then through the bore 285 to the outer surface 275 where the flexible line 55 is wrapped about the axial axis 260 in contact with the outer surface 275 wherein the flexible line 55 is wrapped under the tine 305, thus wedging 315 the flexible line 55 against the outer surface 275 to attach the flexible line 55 to the article 65 via the body 240.

Figure 14:
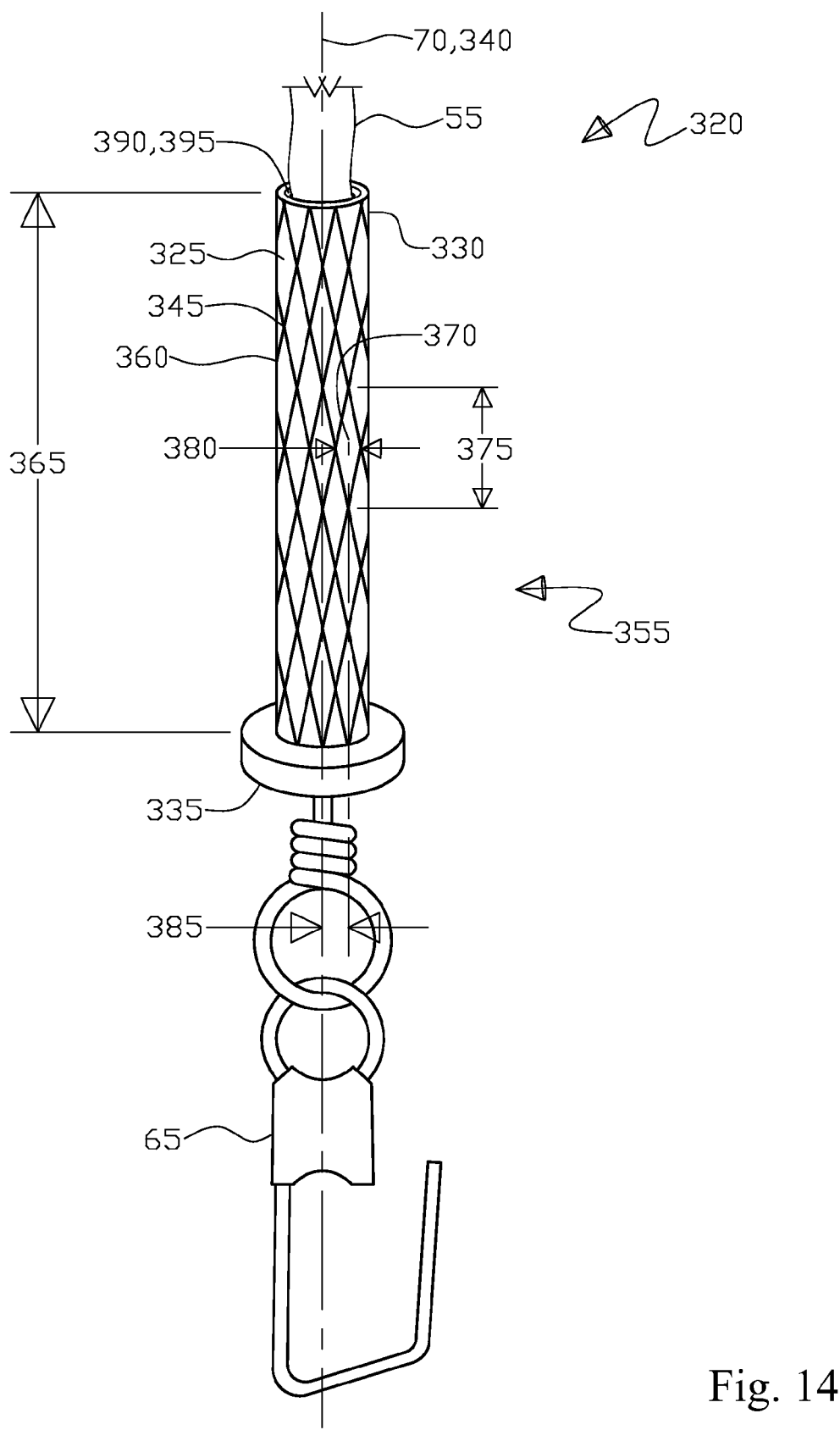
FIG. 14 shows a perspective view of a line engaging apparatus for removably engaging a flexible line having a long axis, to an article in the form of a swivel, also shown is a frame having a primary end portion and a secondary end portion with a spanning axis, the primary end portion is a contractible tube in the tube engaging state diameter, further shown is the flexible expanded metal surrounding sidewall with an expanded length that frictionally encases the flexible line resulting in the flexible line being connected to the article via the frame.
Figure 15:
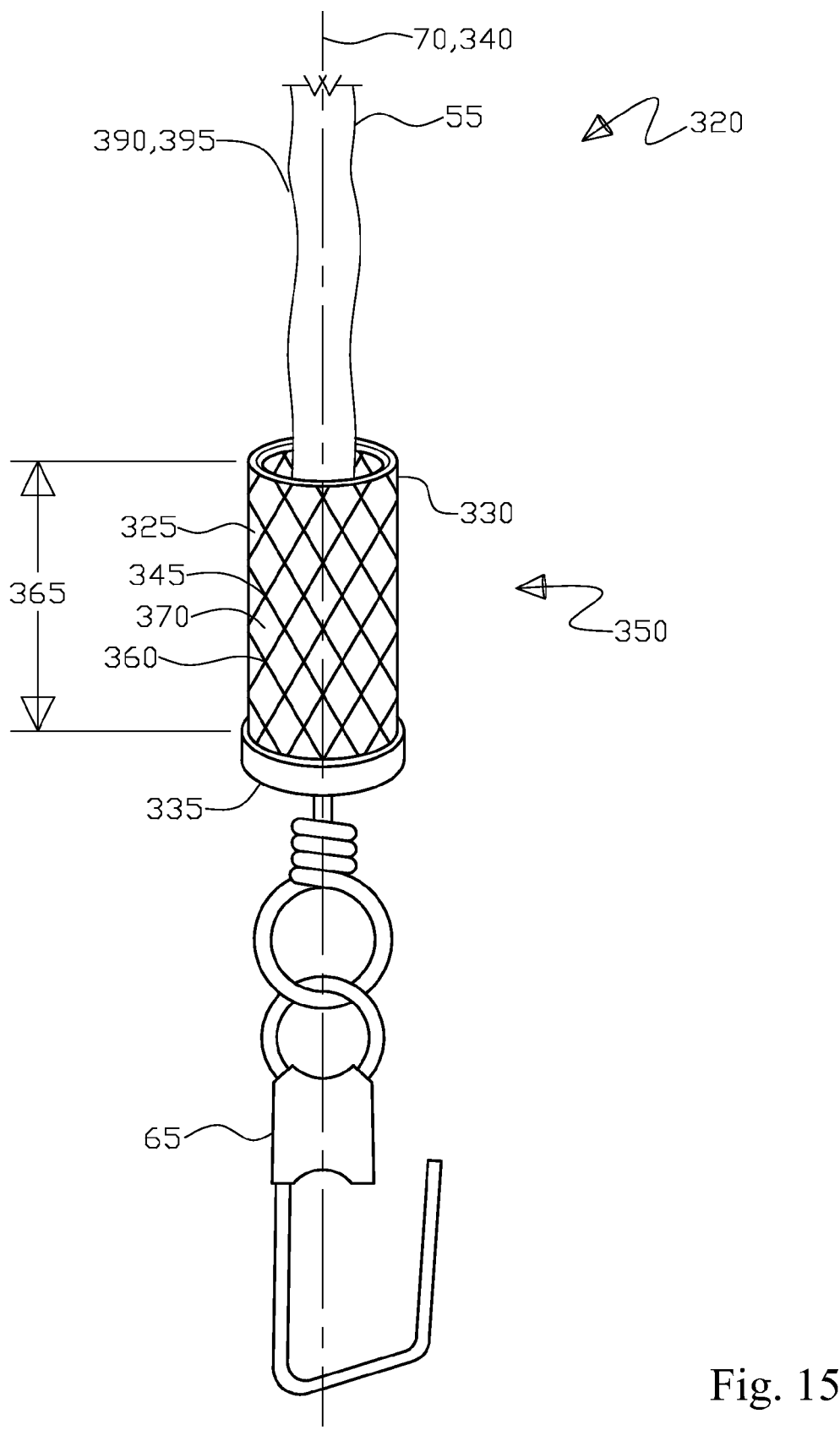
FIG. 15 shows a perspective view of a line engaging apparatus for removably engaging a flexible line having a long axis, to an article in the form of a swivel, also shown is a frame having a primary end portion and a secondary end portion with a spanning axis, the primary end portion is a contractible tube in the tube insertion state diameter, further shown is the flexible expanded metal surrounding sidewall with a compressed length that allows insertion of the flexible line.

Next, FIG. 14 shows a perspective view of a line engaging apparatus 320 for removably engaging a flexible line 55 having a long axis 70, to an article 65 in the form of a swivel, also shown is a frame 325 having a primary end portion 330 and a secondary end portion 335 with a spanning axis 340, the primary end portion 330 is a contractible tube 345 in the tube engaging state 355 diameter, further shown is the flexible expanded metal surrounding sidewall 360 with an expanded length 365 that frictionally encases 390 the flexible line 55 resulting in the flexible line 55 being connected to the article 65 via the frame 325. Continuing, FIG. 15 shows a perspective view of the line engaging apparatus 320 for removably engaging a flexible line 55 having a long axis 70, to an article 65 in the form of a swivel, also shown is a frame 325 having a primary end portion 330 and a secondary end portion 335 with a spanning axis 340, the primary end portion 330 is a contractible tube 345 in the tube insertion state 350 diameter, further shown is the flexible expanded metal surrounding sidewall 360 with a compressed length 365 that allows insertion of the flexible line 55.

Figure 16:
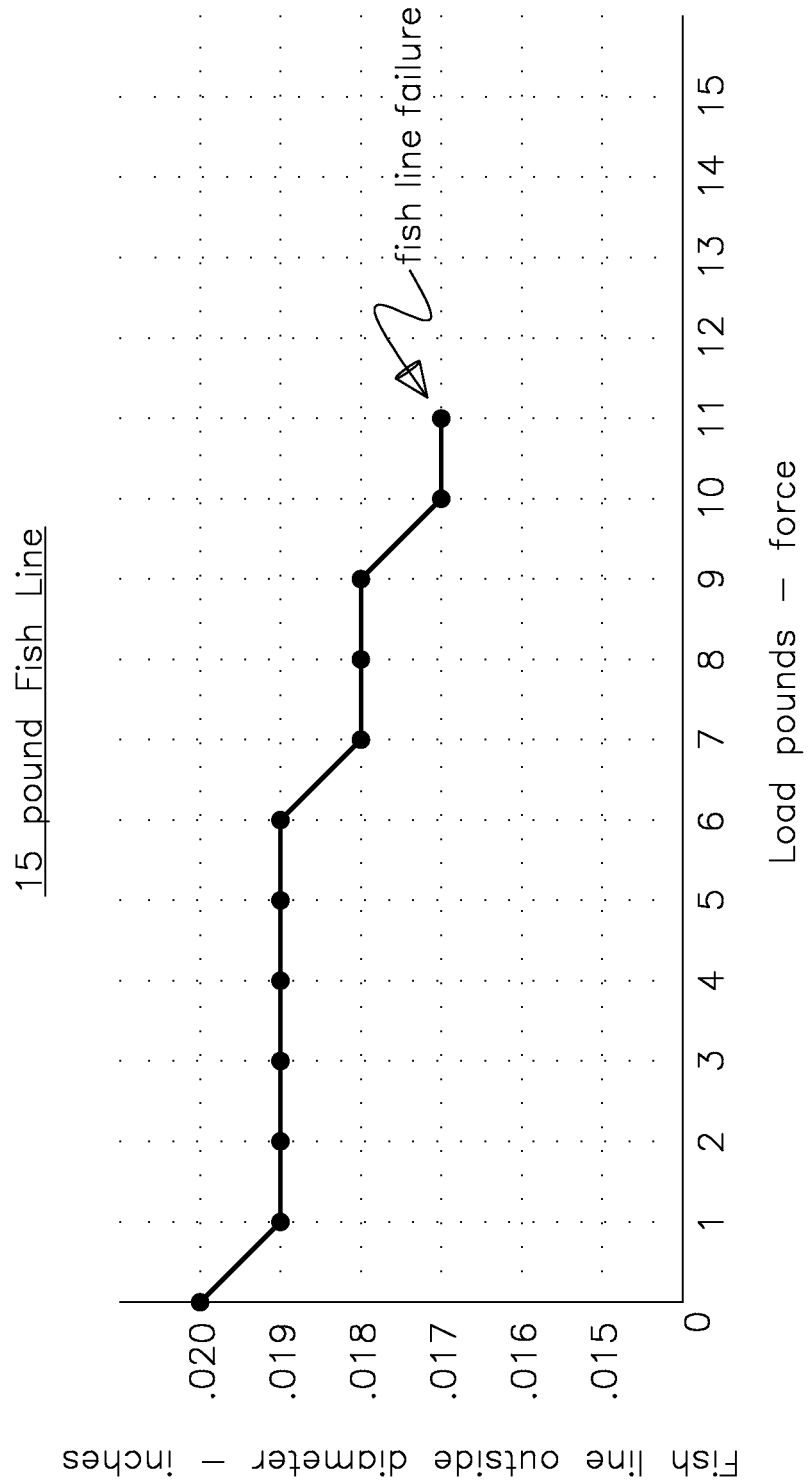
FIG. 16 shows a graph of the test results of the fifteen (15) pound test monofilament fishing line by plotting line diameter reduction versus increasing tensile loads until line failure.
Figure 17:
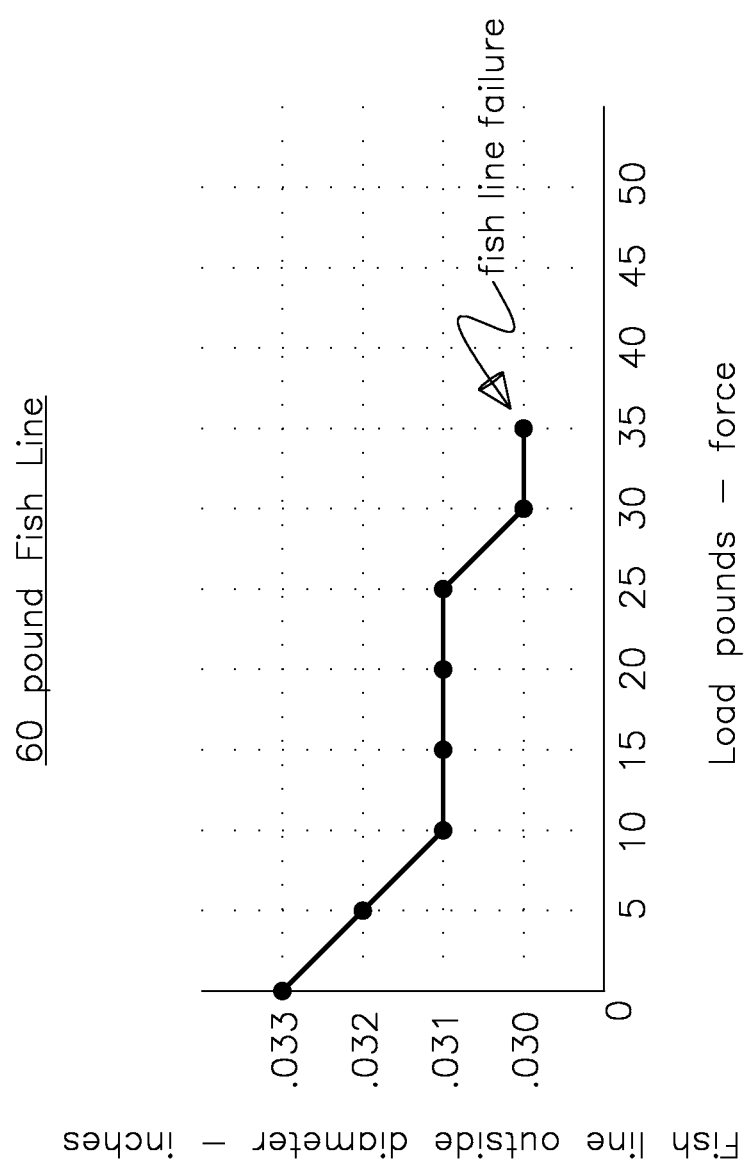
FIG. 17 shows a graph of the test results of the sixty (60) pound test monofilament fishing line by plotting line diameter reduction versus increasing tensile loads until line failure.
Figure 18:
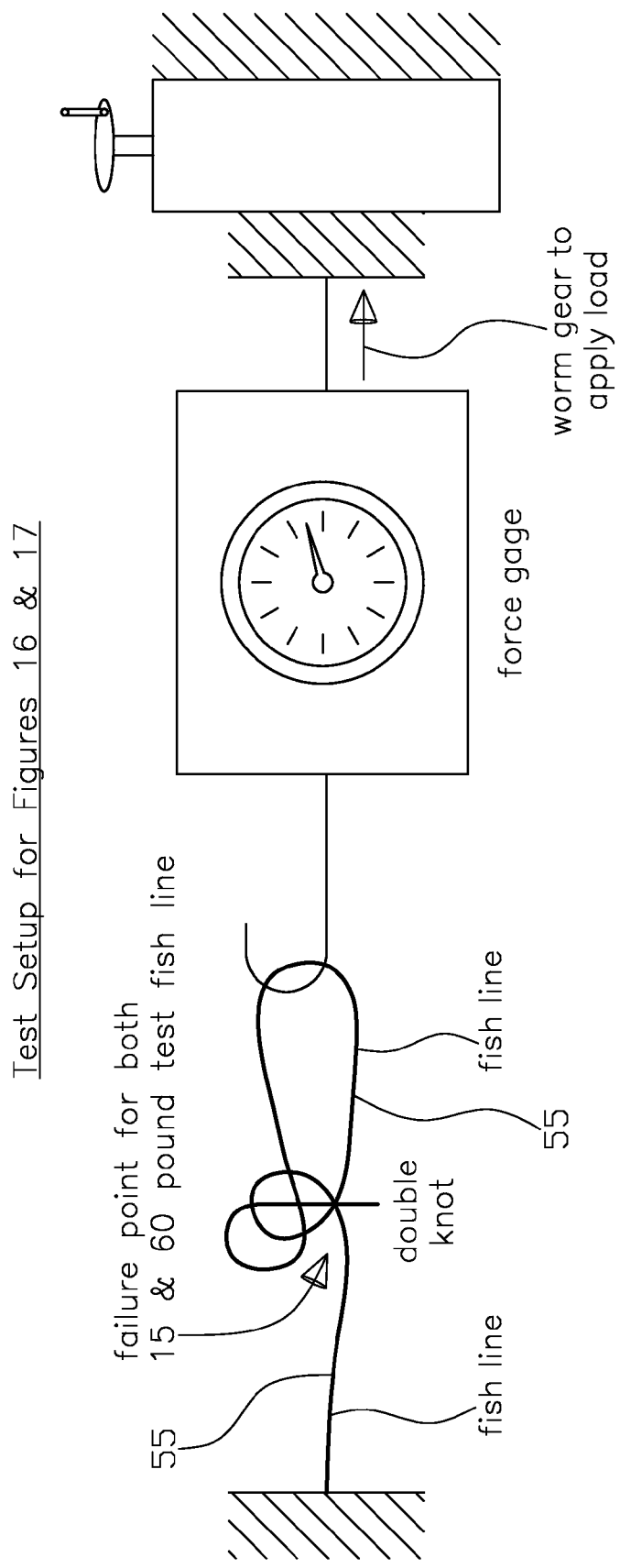
FIG. 18 shows the test setup for the results shown in FIGS. 16 and 17, including the monofilament fish line attachment, the force gage, and the worm gear to apply tensile load to the line.

FIG. 16 shows a graph of the test results of the fifteen (15) pound test monofilament fishing line 55 by plotting line 55 diameter reduction versus increasing tensile loads in pounds force until line 55 failure. Continuing, FIG. 17 shows a graph of the test results of the sixty (60) pound test monofilament fishing line 55 by plotting line 55 diameter reduction versus increasing tensile loads in pounds force until line 55 failure. Further, FIG. 18 shows the test setup for the results shown in FIGS. 16 and 17, including the monofilament fish line 55 attachment, the force gage, and the worm gear to apply tensile load in pounds force to the line 55.

Experimental testing was done to monofilament fish line 55 for both the fifteen (15) pound test rating line and the sixty (60) pound test rating line via tensile loading from zero load up to line 55 failure loading and to the take incremental line 55 diameter measurements corresponding to intermediate tensile loadings, this testing was for the purpose of ascertaining line 55 diameter reductions versus increasing tensile loadings that can lead to reductions in line 55 diameter 75 compression 230 in the line connector 50, 235, or 320 when the monofilament fish line 55 is under varying levels of tension. The raw test data can be found in FIGS. 16, 17, and FIG. 18 for the test setup.

The results were unexpected in that both monofilament fish lines 55 failed at a tensile test level considerably below the rated tensile test level of the line 55, being at eleven (11) pounds failure for the fifteen (15) pound rating line and at thirty five (35) pounds failure for the sixty (60) pound rating line, however noting that the failure point on the line 55 was consistently near the double loop knot, adding emphasis to the significant line 55 weakening that occurs at the bending or kinking point on the line 55, causing the "weak link in the chain" syndrome. Which of course adds the upmost importance to minimizing kinks, nicks, and sharp bends in the fish line 55 that would significantly weaken the line's 55 expected tensile strength, wherein the function of the present invention connector 50, 235, or 320 is to do just this, in providing a controlled contour and smooth tortuous path 135 for the line 55 to follow in the connector 50 or 235 to lessen the opportunity for a sharp bend or kink in the line 55 that could substantially weaken the line's 55 expected tensile strength.

As for the test results, for the fifteen (15) pound test line the % reduction in diameter from the relaxed state or original diameter 75 to just prior to tensile failure is fifteen (15) % and for the sixty (60) pound test line again from the relaxed state to just prior to tensile failure is ten (10) %, thus the connector line 55 compression would need to compensate for this % reduction in line 55 diameter due to tensile loading while the line 55 is in the connector 50, 235, or 320.

Primarily referencing FIGS. 1 through 10, the line connector apparatus 50 is disclosed for removably engaging a flexible line 55 to an article 65, the flexible line 55 having a long axis 70 and an original diameter 75. The line connector apparatus 50 includes the beam 80 having a longitudinal axis 85, the beam 80 having an external surface portion 90, the beam 80 also including a flexible line end portion 95 and an opposing article end portion 100 along the longitudinal axis 85. The flexible line end portion 95 has a void 105 that is disposed partially within 115 the flexible line portion 95 and the void 105 is also partially formed from an open channel 120 adjacent to the external surface portion 90. The void 105 having a slip fit 125 clearance with the flexible line 55, the void 105 having a lengthwise axis 110, wherein the void 105 communicates therethrough the flexible line end portion 95, wherein the void 105 receives 130 the flexible line 55 allowing the flexible line 55 to be manually feed therethrough the void 105 along the long axis 70. Also included in the line connector apparatus 50 is a means 180 for selectively compressing 230 the flexible line 55 that is positioned within the open channel 120 to change the slip fit 125 clearance to an interference fit 215 and the opposing article end portion 100 is attached to the article 65. Wherein, operationally the flexible line 55 is affixed to the flexible line end portion 95 along the long axis 70 via the interference fit 215 resulting in the flexible line 55 being attached to the article 65.

Further, on the line connector apparatus 50, the void 105 forms a tortuous passageway 135 along the lengthwise axis 110, wherein the tortuous passageway 135 is defined by at least three right angle turns 140 along the lengthwise axis 110 to form a loop 175 along the lengthwise axis 110, as best shown in FIGS. 4 and 6. Wherein operationally the tortuous passageway 135 helps restrict the flexible line 55 from moving along the long axis 70 and helps prevent the flexible line 55 from inadvertently dislodging from the beam 80, as best shown in FIGS. 6 and 8. Continuing, for the line connector apparatus 50 wherein the at least three right angle turns 140 form a continuous contoured surface 150 for the void 105, to help eliminate the chance of flexible line 55 being kinked, bent, or damaged—that would as the previously described testing had shown, significantly reduced the actual tensile strength of the flexible line 55. Wherein operationally the flexible line 55 is in contact with the continuous contoured surface 150 to help prevent the flexible line 55 from becoming damaged by being sharply bent, as best shown in FIGS. 6 and 8.

Continuing, on the line connector apparatus 50 for the least three right angle turns 140 they can be substantially equidistant 145 from each other to form a symmetric 155 tortuous passageway 135, as best shown in FIGS. 3, 4, 6, 7, and 8. Wherein operationally the flexible line 55 frictional load 60 as against the passageway 135 is substantially balanced as between each of the right angle turns 140 to lessen the resulting flexible line 55 frictional load 60 as against the means 180 for selectively compressing 230 the flexible line 55, in retaining the flexible line 55 to the beam 80.

Expanding on the means 180 for selectively compressing 230 the flexible line 55 for the line connector apparatus 50, the means 180 for selectively compressing 230 the flexible line 55 is preferably constructed of a finger 185 having a proximal end portion 195 and a distal end portion 205, wherein the proximal end portion 195 is pivotally attached 200 to the flexible line end portion 95, as best shown in FIGS. 2, 4, 6, 7, and 9. The distal end portion 205 is removably engaged 210 to the article end portion, preferably via a snap arrangement as best shown in FIGS. 3 and 4. In addition the finger 185 is positioned to be oppositely disposed 190 from a portion of the passageway 135, namely being the open channel 120, as seen in FIGS. 1, 2, 3, and 4. With the finger 185 having an open state 220 when the distal end portion 205 is not engaged to the article end portion 100, as shown in FIGS. 2, 4, 6, 7, and 9, also a closed state 225 when the distal end 205 is engaged to the article end portion 100, see FIGS. 1, 3, 8, and 10. Wherein operationally, when the finger 185 is in the closed state 225, the finger compresses 230 the flexible line 55 as between the passageway 135 open channel 120 and the finger 185 to further retain the flexible line 55 in the tortuous passageway 135, see FIG. 8. In addition, on the finger 185 compression 230, when the finger is in the closed state it is sized and configured to compress 230 the flexible line 55 to at least fifteen percent (15%) less than the flexible line 55 original diameter 75, to be in accordance with the previously described testing of flexible line 55 original diameter 75 reduction with the application of tension loading, in other words with the line reducing up to fifteen (15%) from the original line diameter 75, there will still be compression 230 placed upon the flexible line 55, see FIG. 8.

Continuing, on the line connector apparatus 50 the tortuous passageway 135 can comprises a portion of which the passageway 135 is disposed therethrough the flexible line end portion 115 and the tortuous passageway 135 also comprises a portion of which the passageway 135 is formed from the open channel 120, wherein passageway transitions from the open channel 120 to the passageway 135 disposed therethrough are chamfered 160 outwardly from the passageway 135 therethrough to the open channel 120, as shown best in FIGS. 4 and 5. Wherein the chamfer 160 being operational to ease and smooth threading of the flexible line 55 from the open channel 120 passageway portion 135 to the disposed therethrough 115 passageway 135 portion, again to help prevent the flexible line 55 from becoming damaged by being sharply bent, increasing the chances of weakening the flexible line 55.

Next, on the line connector apparatus 50 on the portion of the passageway 135 that is disposed therethrough 115 the flexible line end portion 95, can further include a necked aperture 165 allowing communication from the portion of passageway 135 that is disposed therethrough the flexible line end portion 95 to the external surface portion 90, as best shown in FIGS. 1, 2, 5, 8, and 10. Wherein operationally, the necked aperture 165 facilitating the flexible line 55 to be manually passed from the external surface portion 90 to the portion of passageway 135 that is disposed therethrough 115 the flexible line end portion 95, thus reducing the need for threading the flexible line 55 therethrough the portion of passageway 135 that is disposed therethrough 115 the flexible line end portion 95, the purpose being to simplify putting the flexible line 55 through the entire tortuous passageway 135. Also, for the line connector apparatus 50 it can further include a flared section 170 positioned between the necked aperture 165 and the external surface portion 90, again as best shown in FIGS. 1, 2, 5, 8, and 10. Wherein operationally, the flared section 170 helps reduce damage to the flexible line 55 in being manually passed from the external surface portion 90 to the portion of passageway 135 that is disposed therethrough 115 the flexible line end portion 95.

Referring in particular to FIGS. 11, 12, and 13, an alternative embodiment is in a line securing device 235 for removably engaging a flexible line 55 to an article 65, with the flexible line 55 having a long axis 70. The line securing device 235 includes a body 240 having a first end portion 245 and an opposing second end portion 250, the body 240 having a surrounding sidewall 255 disposed between the first 245 and second 250 end portions, the second end portion 250 is attached to the article 65, wherein the surrounding sidewall 255 is positioned about an axial axis 260, with the surrounding sidewall 255 having an inner surface 265 that defines an interior 270 and an outer surface 275. Also included in the line securing device 235 is an opening 280 disposed therethrough the first end portion 245 communicating to the interior and a bore 285 disposed therethrough the surrounding sidewall 255 communicating to the interior 270, the bore 285 having a size 290 of a diameter of the bore 285.

Further included in the line securing device 235 is a slot 295 disposed therethrough the surrounding sidewall 255 communicating to the interior 270, with the slot 295 having a peripheral margin 300 that includes a tine 305 projecting partially into the slot 295, the tine 305 is positioned adjacent to the bore 285. Wherein operationally, the flexible line 55 is feed through the opening 280 to the interior 270 and subsequently through the bore 285 to the outer surface 275 wherein the flexible line 55 is then wrapped about the axial axis 260 being in contact with the outer surface 275 in moving along the axial axis 260 from the bore 285 to the tine 305, see FIGS. 12 and 13. Wherein the flexible line 55 is placed between the tine 305 and the interior 270, wherein continuing the flexible line 55 is placed again in contact with the outer surface 275 thus wedging 315 the flexible line 55 against the tine 305 to secure the flexible line 55 to the body 240 thus attaching the flexible line 55 to the article 65, see again FIGS. 12 and 13.

Continuing, for the line securing device 235 the tine 305 projection has a distance 310 from the tine 305 projection to a remainder of the peripheral margin 300 of equal to or greater than the bore size 290, as shown in FIG. 11, with the purpose being to ensure that the distance 310 will be adequate to facilitate wedging 315 the flexible line 55 as between the tine 305 and the periphery 300.

Referring in particular to FIGS. 14 and 15, another alternative embodiment is in a line engaging apparatus 320 for removably engaging a flexible line 55 to an article 65, the flexible line 55 having a long axis 70, the line engaging apparatus 320 including a frame 325 having a primary end portion 330 and an opposing secondary end portion 335 with a spanning axis 340 disposed therebetween. With the secondary end portion 335 being attached to the article 65 and the primary end portion 330 in the form of an contractible tube 345 having a tube insertion state 350 diameter and a tube engaging state 355 diameter. Further included in the line engaging apparatus 320 is a flexible expanded metal surrounding sidewall 360 that is positioned about the spanning axis 340 forming the contractible tube 345, the surrounding sidewall 360 having a length 365 along the spanning axis 340. Wherein compressing the length 365 places the surrounding sidewall 360 into the insertion state diameter 350, see FIG. 15, and expanding the length 365 places the surrounding sidewall 360 into the engaging state diameter 355, see FIG. 14. The expanded metal 360 having a plurality of diamond shaped slits 370, wherein each slit 370 has a major axis 375 and a minor axis 380, wherein the major axis 375 is parallel 385 with the spanning axis 340, as best seen in FIG. 14. Wherein operationally, the flexible line 55 is manually placed within the surrounding sidewall 360 in the insertion state 350 with the flexible line 55 contacting the secondary end portion 335 and subsequently manually placing the surrounding sidewall 360 into the engaging state 355 wherein the surrounding sidewall 360 frictionally encases 390 the flexible line 55 resulting in the flexible line 55 being connected to the article 65, as shown in FIG. 14.

Continuing, for the line engaging apparatus 320 the surrounding sidewall 360 has a smooth inner surface 395 to operationally prevent the flexible line 55 from incurring surface damage in the engaging state 355, with smooth being defined as not having sharp protrusions that could cut into the original outside diameter 75 of the flexible line 55, wherein the smooth definition would allow rounded (non-sharp) protrusions. Also, on the line engaging apparatus 320 on the flexible expanded metal surrounding sidewall 360 could be constructed of galvanized steel braided cable, to operationally increase flexibility of the surrounding sidewall 360 for an increased frictional encasement 390 of the flexible line 55.

CONCLUSION

Accordingly, the present invention of a line connector apparatus 50 and alternative embodiments 235 and 320 has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

The invention claimed is:

1. A line connector apparatus for removably engaging a flexible line to an article, the flexible line having a long axis and an original diameter, said line connector apparatus comprising:
  (a) a beam having a longitudinal axis, said beam having an external surface portion, said beam including a flexible line end portion and an opposing article end portion along said longitudinal axis;
  (i) said flexible line end portion having a void that is disposed partially within said flexible line portion and said void partially formed from an open channel adjacent to said external surface portion, said void having a slip fit clearance with the flexible line, said void having a lengthwise axis, wherein said void communicates therethrough said flexible line end portion, wherein said void forms a tortuous passageway along said lengthwise axis, wherein said tortuous passageway is defined by at least three right angle turns along said lengthwise axis to form a loop along said lengthwise axis, wherein said at least three right angle turns form a continuous contoured surface for said void, wherein said at least three right angle turns are substantially equidistant from each other to form a symmetric tortuous passageway, wherein said void receives the flexible line allowing the flexible line to be manually fed therethrough said void along the lengthwise axis;

(ii) a means for selectively compressing the flexible line that is positioned within said open channel to change said slip fit clearance to an interference fit, wherein said means for selectively compressing the flexible line is constructed of a finger having a proximal end portion and a distal end portion, wherein said proximal end portion is pivotally attached to said flexible line end portion and said distal end portion is removably engaged to said article end portion, wherein said finger is positioned to be oppositely disposed from a portion of said passageway, said finger having an open state when said distal end is not engaged to said article end portion and a closed state when said distal end is engaged to said article end portion and;

(iii) said opposing article end portion is attached to the article, wherein operationally the flexible line is affixed to said flexible line end portion along the long axis via said interference fit resulting in the flexible line being attached to the article, wherein operationally said tortuous passageway helps restrict the flexible line from moving along the long axis and helps prevent the flexible line from inadvertently dislodging from said beam with the flexible line being in contact with said continuous contoured surface to help prevent the flexible line from becoming damaged by being sharply bent, further a flexible line frictional load against said passageway is substantially balanced between each of said right angle turns and when said finger is in said closed state, said finger compresses the flexible line between said passageway and said finger to further retain the flexible line in said tortuous passageway.

2. A line connector apparatus according to claim 1 wherein said tortuous passageway comprises a portion of which said passageway is disposed therethrough said flexible line end portion and said tortuous passageway comprises a portion of which said passageway is formed from said open channel, wherein passageway transitions from said open channel to said portion of said passageway disposed therethrough said flexible line end portion are chamfered outwardly from said portion of said passageway disposed therethrough said flexible line end portion to said open channel, being operational to ease threading of the flexible line from said portion of said passageway formed from said open channel to said portion of said passageway disposed therethrough said flexible line end portion.

3. A line connector apparatus according to claim 2 wherein said portion of said passageway that is disposed therethrough said flexible line end portion further comprises a necked aperture allowing communication from said portion of said passageway that is disposed therethrough said flexible line end portion to said external surface portion, wherein operationally facilitating the flexible line to be manually passed from said external surface portion to said portion of said passageway that is disposed therethrough said flexible line end portion.

4. A line connector apparatus according to claim 3 further comprising a flared section positioned between said necked aperture and said external surface portion, wherein operationally said flared section helps reduce damage to the flexible line in being manually passed from said external surface portion to said portion of said passageway that is disposed therethrough said flexible line end portion.

5. A line connector apparatus according to claim 1 wherein said finger in said closed state is sized and configured to compress the flexible line to at least fifteen percent (15%) less than the flexible line original diameter.

* * * * *